United States Patent
Kwak et al.

(10) Patent No.: US 11,984,788 B2
(45) Date of Patent: May 14, 2024

(54) ELECTRIC MOTOR

(71) Applicant: LG Electronics Inc., Seoul (KR)

(72) Inventors: Sunghoon Kwak, Seoul (KR); Hyuk Nam, Seoul (KR); Sanghoon Park, Seoul (KR); Seoyoung Jeong, Seoul (KR); Namgi Kim, Seoul (KR); Minsoo La, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 17/497,344

(22) Filed: Oct. 8, 2021

(65) Prior Publication Data

US 2022/0271607 A1    Aug. 25, 2022

(30) Foreign Application Priority Data

Feb. 24, 2021    (KR) .................. 10-2021-0024974

(51) Int. Cl.
| | |
|---|---|
| *H02K 5/16* | (2006.01) |
| *H02K 1/2786* | (2022.01) |
| *H02K 5/173* | (2006.01) |
| *H02K 7/00* | (2006.01) |

(52) U.S. Cl.
CPC ......... *H02K 5/1732* (2013.01); *H02K 1/2786* (2013.01); *H02K 7/003* (2013.01)

(58) Field of Classification Search
CPC .... H02K 7/003; H02K 1/2786; H02K 5/1732; H02K 7/083; H02K 9/06; H02K 5/24
USPC .................................................. 310/90, 40 R
See application file for complete search history.

(56) References Cited

U.S. PATENT DOCUMENTS

| | | | | |
|---|---|---|---|---|
| 4,259,603 A | * | 3/1981 | Uchiyama | H02K 29/08 |
| | | | | 310/90 |
| 7,592,726 B2 | * | 9/2009 | Heyder | F16F 1/326 |
| | | | | 310/90 |
| 2006/0250039 A1 | * | 11/2006 | Yamamoto | H02K 9/06 |
| | | | | 310/90 |

FOREIGN PATENT DOCUMENTS

| | | | |
|---|---|---|---|
| JP | 2003074549 | 3/2003 | |
| JP | 3402668 | * 5/2003 | ............. H02K 7/14 |
| JP | 2008175337 | 7/2008 | |
| JP | 2016032422 | 3/2016 | |
| KR | 200488662 | 2/2019 | |
| KR | 20190124667 | 11/2019 | |
| WO | WO 2020/183574 | 9/2020 | |

OTHER PUBLICATIONS

Office Action in Korean Appln. No. 10-2021-0024974, dated May 1, 2023, 14 pages (with English translation).

* cited by examiner

*Primary Examiner* — Terrance L Kenerly
(74) *Attorney, Agent, or Firm* — Fish & Richardson P.C.

(57) ABSTRACT

An electric motor includes a stator, a rotor having a rotating shaft, first and second bearings each having an outer ring, balls, and an inner ring, and spaced apart axially from each other, a preload washer including a shaft section having a preset fixed length in the axial direction, and an elastically-deformable portion extending from one end portion of the shaft section to be elastically deformable, the preload washer applying a preset intensity of preload to the inner ring of the first or second bearing, and a coupling member screwed into an end portion of the rotating shaft and elastically deforming the preload washer in the axial direction. This structure may result in preventing an excessive preload from being applied to the bearing and allowing a preset preload to be stably maintained when thrust is applied.

17 Claims, 29 Drawing Sheets

ELECTRIC MOTOR

CROSS-REFERENCE TO RELATED APPLICATION

Pursuant to 35 U.S.C. § 119(a), this application claims the benefit of the earlier filing date and the right of priority to Korean Patent Application No. 10-2021-0024974, filed on Feb. 24, 2021, the contents of which are incorporated by reference herein in their entirety.

TECHNICAL FIELD

The present disclosure relates to an electric motor, and more particularly, to an electric motor capable of applying a preload to a bearing in an axial direction.

BACKGROUND

As is well known, an electric motor or motor (hereinafter, referred to as 'motor') is a device that converts electrical energy into mechanical energy.

Such a motor typically includes a stator, a rotating shaft, and a rotor spaced apart from the stator with a preset air gap and rotating centering on the rotating shaft.

The rotating shaft is usually rotatably supported by a plurality of bearings.

The plurality of bearings is implemented as a ball bearing that has an outer ring, an inner ring concentrically disposed at an inner side of the outer ring, and a plurality of balls provided between the outer ring and the inner ring.

Some of such motors are provided with a fan, blades or rotary blades (hereinafter, referred to as 'rotary blades') on the rotating shaft to rotate the rotary blade.

However, in the related art motor having the rotary blades, thrust is applied to the bearing in an axial direction when the rotary blade is rotated, and clearances among the outer ring, the balls, and the inner ring become small. As a result, friction is increased between metals, and the lifespan of the bearing is significantly shortened.

In consideration of this problem, in some motors, for example, drone motors, a method of assembling a thrust screw using a torque meter is used such that a preload acting opposite to the thrust is applied to the bearing.

However, in the related art drone motor, among the bearings spaced apart in the axial direction, a preload is applied to press the inner ring of an upper bearing downward and to press the inner ring of a lower bearing upward. When the rotary blades are rotated during the operation of the drone motor, the preload applied to the inner ring of the upper bearing is released due to a generation of a trust. This causes a decrease in clearance between the inner ring of the upper bearing and balls, thereby drastically increasing wear of those parts.

In addition, in the related art drone motor, since a preload force is stored as minute deformation energy according to changes in thread profile and length of a thrust screw, even though a coupling length of the thrust screw is minutely changed, the preload (preload force) exceeds or falls short of an appropriate range of a preset preload, which makes it difficult to apply a proper preload.

On the other hand, in consideration of this problem, in some motors, a washer that applies an elastic force (preload) to the bearing in an opposite direction to thrust applied when the rotary blades are rotated is used.

However, in one motor having a washer applying a preload in the related art, in order to apply a preload to an outer ring of a bearing, a slidable structure is provided not only between the outer ring of the bearing and a bearing accommodating portion of a housing but also between an inner ring and a rotating shaft. As a result, a slip is increased due to a relative speed difference during operation, which causes a shaft center of the motor to be misaligned, thereby drastically shortening the lifespan of the motor.

In addition, in another motor having a washer for applying a preload in the related art, a typical wave washer is provided with a flange portion and changes in a coupling length, thereby adjusting an amount of preload.

However, in the motor having the wave washer provided with the flange portion, since a screw structure coupled to the flange portion is needed, which causes the number of parts to be increased and a configuration to be complicated.

SUMMARY

Therefore, one aspect of the present disclosure is to provide an electric motor capable of suppressing a preload from being excessively applied to a bearing and stably maintaining a preset preload when thrust is applied.

Another aspect of the present disclosure is to provide an electric motor capable of suppressing an excessive increase in the number of parts and/or processes for applying a preload.

Still another aspect of the present disclosure is to provide an electric motor capable of reducing a manufacturing cost of a component for applying a preload.

An electric motor according to the present disclosure for solving the above problems may include a preload washer elastically deformed within a preset range in an axial direction, and may be brought into contact with an inner ring of a bearing that rotatably supports a rotating shaft so as to apply a preset intensity of preload to the inner ring.

More specifically, a preload washer may include a spacer having a rotating shaft hole therein, and having a fixed length in an axial direction, and brought into contact with an inner ring of a bearing at one end portion thereof, and an elastically-deformable portion extending from another end portion of the spacer in a radial direction and the axial direction to have a free length so as to be elastically deformed in the axial direction. Accordingly, the preload washer can apply a preset intensity of preload to the inner ring of the bearing.

A plurality of rotating blades may be disposed on one end portion of the rotating shaft.

Here, the plurality of rotating blades may generate lift during rotation, and thrust may be applied to the rotating shaft in the axial direction when the lift is generated.

A coupling member may be disposed in another end portion of the rotating shaft and moved in the axial direction relative to the rotating shaft so as to elastically deform the preload washer in the axial direction.

Here, the free length and the fixed length of the preload washer may be set significantly larger than a displacement occurred in the axial direction when the thrust generated by the plurality of rotating blades is applied.

Accordingly, even when the thrust generated due to the rotation of the plurality of rotating blades is applied, the inner ring can still be pressed by the preload washer in the axial direction, thereby stably maintaining a clearance among an outer ring, a ball, and the inner ring of the bearing, which is preset to be suitable for rotation.

According to the configuration, the outer ring, the ball, and the inner ring can maintain the preset clearance suitable for rotation during the rotation of the plurality of rotating blades, thereby preventing forced wear of the outer ring, the ball, and the inner ring from being caused due to a change in (reduction of) the clearance.

This may result in extending the useful life of the bearing.

Since the preload washer is elastically deformed within the fixed length and the free length, it is possible to exclude a tool such as a torque meter (torque measuring instrument) or a torque wrench that is used to apply a preload with a preset intensity.

The coupling member can be coupled quickly and easily by using a general tool that does not have a torque measuring function.

In one implementation, the electric motor may include a base member, a stator coupled to an outside of the base member, a rotor having a rotating shaft, a rotor frame coupled to the rotating shaft to be locked in an axial direction, and permanent magnets disposed on the rotor frame, the rotor being rotatably coupled to the stator, a first bearing and a second bearing each having an outer ring, a ball, and an inner ring, and spaced apart from each other in an axial direction between the base member and the rotating shaft, a preload washer having a rotating shaft hole that accommodates the rotating shaft, and provided with a shaft section having a preset fixed length in the axial direction and an elastically-deformable portion extending from one end portion of the shaft section to be elastically deformable, the preload washer applying a preset intensity of preload to the inner ring of the first bearing or the inner ring of the second bearing, and a coupling member screwed into an end portion of the rotating shaft to be relatively movable in the axial direction and elastically deforming the preload washer in the axial direction.

The base member may be formed in an annular shape.

The stator may be coupled to the outside of the base member.

The rotor may be rotatably disposed at the outside of the stator with an air gap.

The stator may include a stator core and a stator coil wound around the stator core.

The rotor may include a rotating shaft, a rotor frame coupled to the rotating shaft to be locked in the axial direction, and permanent magnets provided on the rotor frame.

The permanent magnets may be concentrically disposed to form the air gap with the stator core.

The rotating shaft may have a long length to protrude to both sides of the rotor frame.

A plurality of rotating blades may be disposed on one end portion of the rotating shaft.

A coupling member may be disposed in another end portion of the rotating shaft to be movable relative to the rotating shaft in the axial direction.

The coupling member may include a screw and a washer interposed between the screw and the rotating shaft.

The rotating shaft may be coupled through a center of the base member.

A bearing for rotatably supporting the rotating shaft may be disposed between the rotating shaft and the base member.

The bearing may include a first bearing and a second bearing spaced apart from each other in the axial direction.

Here, the first bearing may be disposed close to the rotor frame and the second bearing may be disposed farther away from the rotor frame than the first bearing.

Here, the first bearing may be referred to as a rotor frame side bearing in that it is disposed close to the rotor frame, and the second bearing may be referred to as a rotating shaft end side bearing in that it is disposed close to the end of the rotating shaft.

The first bearing and the second bearing each may include an outer ring, an inner ring concentrically disposed at an inner side of the outer ring, and a plurality of balls provided between the outer ring and the inner ring.

Here, a bearing accommodating portion for accommodating the bearing (the first bearing and the second bearing) may be provided inside the base member.

The bearing accommodating portion may include a first bearing accommodating portion and a second bearing accommodating portion spaced apart from each other in the axial direction.

The bearing may be press-fitted into the bearing accommodating portion.

More specifically, the outer ring of the first bearing may be press-fitted into the first bearing accommodating portion.

The outer ring of the second bearing may be press-fitted into the second bearing accommodating portion.

The base member may include an outer ring supporting part for supporting the outer ring of the bearing in the axial direction.

The outer ring supporting part may include a first bearing outer ring supporting portion for supporting the outer ring of the first bearing.

The outer ring supporting part may include a second bearing outer ring supporting portion for supporting the outer ring of the second bearing.

The preload washer may have a preset fixed length and a free length, and may be elastically deformable in the axial direction within the fixed length and the free length.

Accordingly, the use of a separate torque measurement tool for elastically deforming the preload washer in the axial direction can be excluded.

Therefore, the elastic deformation of the preload washer in the axial direction can be made by using a general tool without a torque measuring function.

The preload washer may be disposed to be brought into contact with the inner ring of the first bearing or the inner ring of the second bearing in the axial direction.

The preload washer may be coupled to the rotating shaft to come in contact with the first bearing or the second bearing.

In one implementation, the rotor frame may be disposed at an upper side of the first bearing in the axial direction.

A plurality of rotating blades may be disposed on an upper end of the rotating shaft, and the coupling member may be disposed in a lower end of the rotating shaft.

Thrust may be applied upward in the axial direction when the plurality of rotating blades rotates.

The preload washer may include a first preload washer inserted between the rotor frame and the inner ring of the first bearing.

The first preload washer may include a shaft section with the fixed length in the axial direction and having one end portion in contact with the inner ring of the first bearing and another end portion contactable with the rotor frame, and an elastically-deformable portion extending from an end portion of the shaft section in a radial direction and the axial direction, respectively, to have a free length so as to be brought into contact with the rotor frame.

Here, at the beginning of coupling the coupling member, the elastically-deformable portion may be brought into contact with the rotor frame at the free length.

When the coupling of the coupling member is completed, the elastically-deformable portion may be elastically deformed in the axial direction to be arranged parallel to the fixed length, and another end portion of the shaft section may be brought into contact with the rotor frame.

Accordingly, reaction force of the coupling member may be remarkably increased and an operator can obviously and easily recognize (sense) this to terminate the coupling of the coupling member.

Here, the shaft section may be formed in a cylindrical shape having the rotating shaft hole therein.

Contact portions may radially protrude from both end portions of the shaft section, which are spaced apart from each other in the axial direction, and extend in the circumferential direction.

Here, any one of the contact portions formed at the both end portions of the shaft section may refer to a stopper in that it increases the reaction force when the coupling member is coupled and limits the coupling of the coupling member.

In one implementation, the elastically-deformable portion may be provided in plurality spaced apart from one another in a circumferential direction of the rotor.

Accordingly, the intensity of an elastic deformation force (preload) can be easily adjusted by adjusting the size (width and length) and the number of the elastically-deformable portions.

The preload washer may include an annular portion connecting end portions of the plurality of elastically-deformable portions.

Slots may be formed in a penetrating manner between adjacent elastically-deformable portions in the circumferential direction.

In one implementation, the first preload washer may include a rotor frame contact portion connecting end portions of the plurality of elastically-deformable portions, having a ring shape, and brought into contact with the rotor frame.

Accordingly, a preload applied between the rotor frame and the inner ring of the bearing can be uniformly applied to the inner ring.

In one implementation, the rotor frame may be disposed at a lower side of the second bearing.

Here, a plurality of rotating blades may be disposed on a lower end of the rotating shaft and the coupling member may be disposed in an upper end of the rotating shaft.

Thrust may be applied upward in the axial direction when the plurality of rotating blades rotates.

The preload washer may include a second preload washer inserted between the coupling member and the inner ring of the second bearing.

In one implementation, the second preload washer may include a shaft section with the fixed length in the axial direction and having one end portion in contact with the inner ring of the second bearing and another end portion contactable with the coupling member, and an elastically-deformable portion extending from an end portion of the shaft section in a radial direction and the axial direction, respectively, to have a free length so as to be brought into contact with the coupling member.

Here, the second preload washer may include an inner ring contact portion protruding from the shaft section in the radial direction and brought into contact with the inner ring of the second bearing.

In one implementation, the rotor frame may be disposed at an upper side of the first bearing in the axial direction.

A plurality of rotating blades may be disposed on an upper end of the rotating shaft and the coupling member may be disposed in a lower end of the rotating shaft.

Here, thrust may be applied upward in the axial direction when the plurality of rotating blades rotates.

The preload washer may include a third preload washer inserted between the inner ring of the second bearing and the coupling member.

In one implementation, the third preload washer may include a shaft section with the fixed length in the axial direction and having one end portion in contact with the coupling member and another end portion contactable with an end portion of the rotating shaft, and an elastically-deformable portion extending from the shaft section in a radial direction and the axial direction, respectively, to have a free length so as to be brought into contact with the inner ring of the second bearing.

In one implementation, the elastically-deformable portion may be provided in plurality spaced apart from one another in a circumferential direction of the rotor.

The third preload washer may include an inner ring contact portion connecting end portions of the plurality of elastically-deformable portions and brought into contact with the inner ring of the second bearing.

In one implementation, the third preload washer may include a skirt portion extending from the inner ring contact portion in the axial direction.

In one implementation, the preload washer may include a first partial preload washer and a second partial preload washer coupled to each other in the axial direction.

This may result in simplifying the configuration of facilities for manufacturing the preload washer.

In one implementation, the first partial preload washer may define a part of the fixed length in the axial direction, and include a first partial shaft section coupled to the rotating shaft, and an elastically-deformable portion extending from the first partial shaft section in a radial direction and the axial direction to have a free length, and elastically deformable in the axial direction.

The second partial preload washer may include a second partial shaft section coupled to the rotating shaft to define the fixed length cooperatively with the first partial shaft section in an axial direction, and a contact portion extending from the second partial shaft section in the radial direction.

Here, the second partial preload washer may further include a contact portion extending from the second partial shaft section in the radial direction.

In one implementation, the first partial shaft section and the second partial shaft section may be engaged with each other by an engagement part to be overlapped in the axial direction and locked in the circumferential direction.

The engagement part may include a protrusion protruding in the axial direction from one of contact surfaces between the first partial shaft section and the second partial shaft section, and a protruding accommodating portion formed in another contact surface to accommodate the protrusion.

Here, the first partial preload washer and the second partial preload washer may be formed of different materials.

Specifically, the first partial preload washer having the elastically-deformable portion may be formed of a material having a larger elastic modulus than the second partial preload washer.

For example, the first partial preload washer may be made of spring steel, and the second partial preload washer may be made of general steel.

This may result in reducing a usage amount of the material having the relatively large elastic modulus.

Therefore, as compared to manufacturing the whole preload washer using a material having a large elastic modulus, the number of processes of manufacturing parts using the material having the large elastic modulus can be reduced, thereby facilitating the manufacturing.

In addition, an overall manufacturing cost of the preload washer can be reduced.

In one implementation, the second partial preload washer may include a first partial shaft section accommodating portion that accommodates the first partial shaft section of the first partial preload washer in the axial direction.

Accordingly, the deformation of the first partial shaft section can be suppressed.

In one implementation, an end portion of the first partial shaft section accommodating portion may be brought into contact with the elastically-deformable portion in the axial direction to support the elastically-deformable portion when the elastically-deformable portion is elastically deformed.

Here, the first partial preload washer having the elastically-deformable portion may be formed of a material having a larger elastic modulus than the second partial preload washer. In detail, the first partial preload washer may be made of spring steel, and the second partial preload washer may be made of general steel.

This may result in reducing a usage amount of the material having the relatively large elastic modulus.

Therefore, as compared to manufacturing the whole preload washer using a material having a large elastic modulus, the number of processes of manufacturing parts using the material having the large elastic modulus can be reduced, thereby facilitating the manufacturing.

In addition, an overall manufacturing cost of the preload washer can be reduced.

As described above, according to one implementation of the present disclosure, by providing a preload washer that has a preset fixed length and a free length in an axial direction and is elastically deformable within the free length and the fixed length, the use of mechanism and/or tool having a torque adjustment function upon coupling can be excluded.

A preset clearance for each of an outer ring, a ball, and an inner ring of a bearing can be maintained, thereby suppressing forced wear of the bearing caused due to the change in the clearance. Therefore, the useful life of the bearing can be extended.

A rotor frame may be disposed at an upper side of a first bearing and the preload washer may include a first preload washer inserted between the rotor frame and an inner ring of the first bearing, so that the inner ring of the first bearing can be pressed in the axial direction even when thrust generated upon rotation of the rotor frame is applied, which may result in preventing the change in the preset clearance for each of an outer ring, a ball, and the inner ring of the first bearing. Therefore, the useful life of the first bearing can be extended.

A rotor frame may be disposed at a lower side of a second bearing and the preload washer may include a second preload washer inserted between the rotor frame and an inner ring of the second bearing, so that the inner ring of the second bearing can be pressed in the axial direction even when thrust generated upon rotation of the rotor frame is applied, which may result in preventing the change in the preset clearance for each of an outer ring, a ball, and the inner ring of the second bearing. Therefore, the useful life of the second bearing can be extended.

A rotor frame may be disposed at an upper side of a first bearing and the preload washer may include a third preload washer inserted between the rotor frame and an inner ring of a second bearing, so that the inner ring of the second bearing can be pressed in the axial direction even when thrust generated upon rotation of the rotor frame is applied, which may result in preventing the change in the preset clearance for each of an outer ring, a ball, and the inner ring of the second bearing. Therefore, the useful life of the second bearing can be extended.

The preload washer may include a first partial preload washer and a second partial preload washer coupled to each other in the axial direction, which may allow the entire manufacturing process of the preload washer to be divided into partial processes. This may result in simplifying the facilities for manufacturing the preload washer and facilitating the manufacturing.

The first partial preload washer may include an elastically-deformable portion and the second partial preload washer may be made of a material having a smaller elastic modulus than the first partial preload washer, thereby reducing a usage amount of a material having a large elastic modulus.

This may result in reducing a material cost of the material having the large elastic modulus.

Also, the number of manufacturing processes using the material having the large elastic modulus can be reduced, thereby facilitating the manufacturing.

In addition, since the first partial preload washer and the second partial preload washer are engaged with each other by an engagement part to be overlapped in the axial direction and locked in the circumferential direction, thereby suppressing the generation of a clearance between the first partial preload washer and the second partial preload washer in the axial direction and the circumferential direction.

Since the second partial preload washer may include a first partial shaft section accommodating portion for accommodating the first partial shaft section of the first partial preload washer, the first partial preload washer can be stably supported.

Since an end portion of the first partial shaft section accommodating portion may be brought into contact with the elastically-deformable portion in the axial direction, unnecessary deformation of the elastically-deformable portion can be suppressed when the elastically-deformed portion is elastically deformed.

DETAILED DESCRIPTION

Hereinafter, implementations of the present disclosure will be described in detail with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context. In describing the present disclosure, if a detailed explanation for a related known function or construction is considered to unnecessarily divert the main point of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 1:
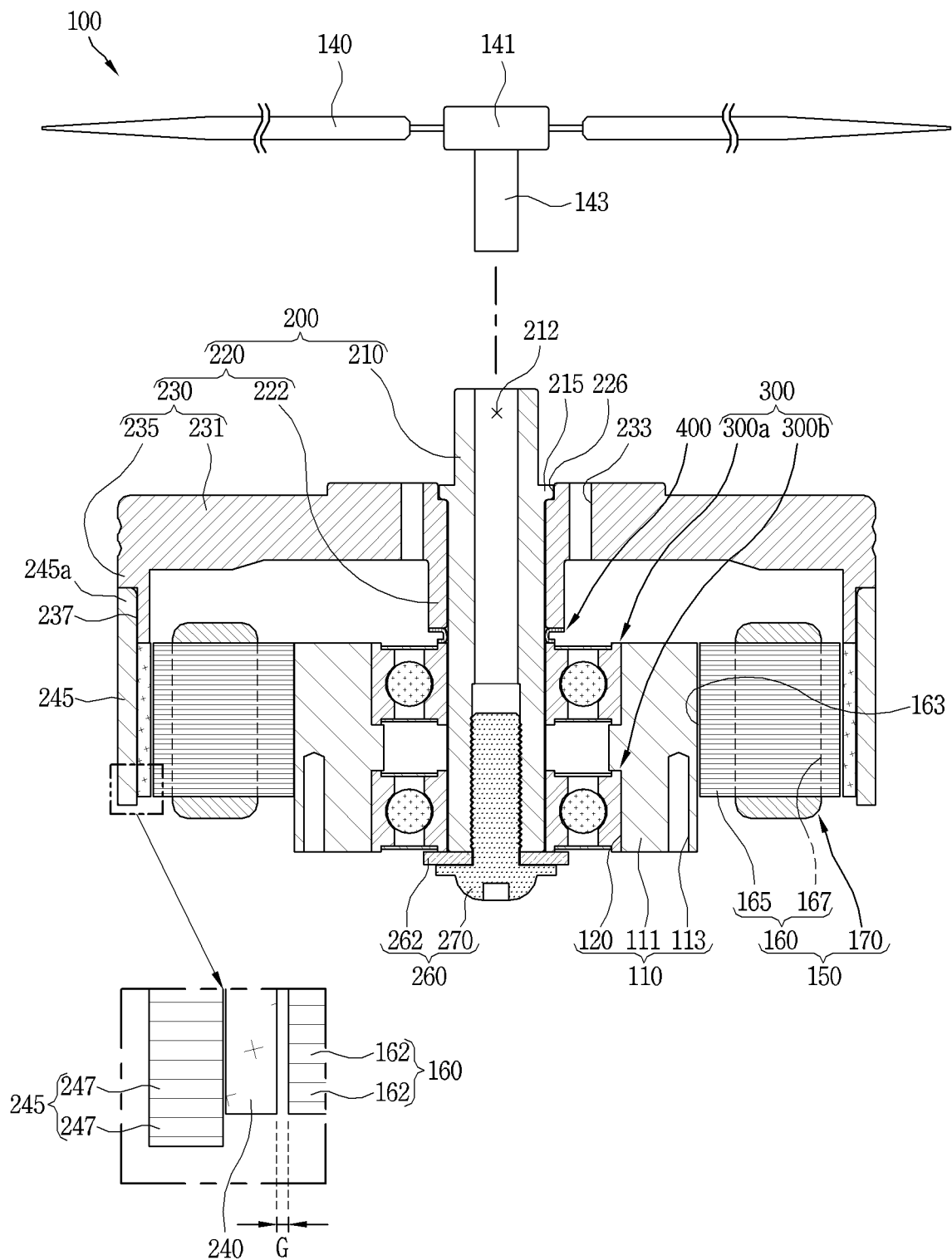
FIG. 1 is a sectional view of an electric motor in accordance with one implementation of the present disclosure.
Figure 2:
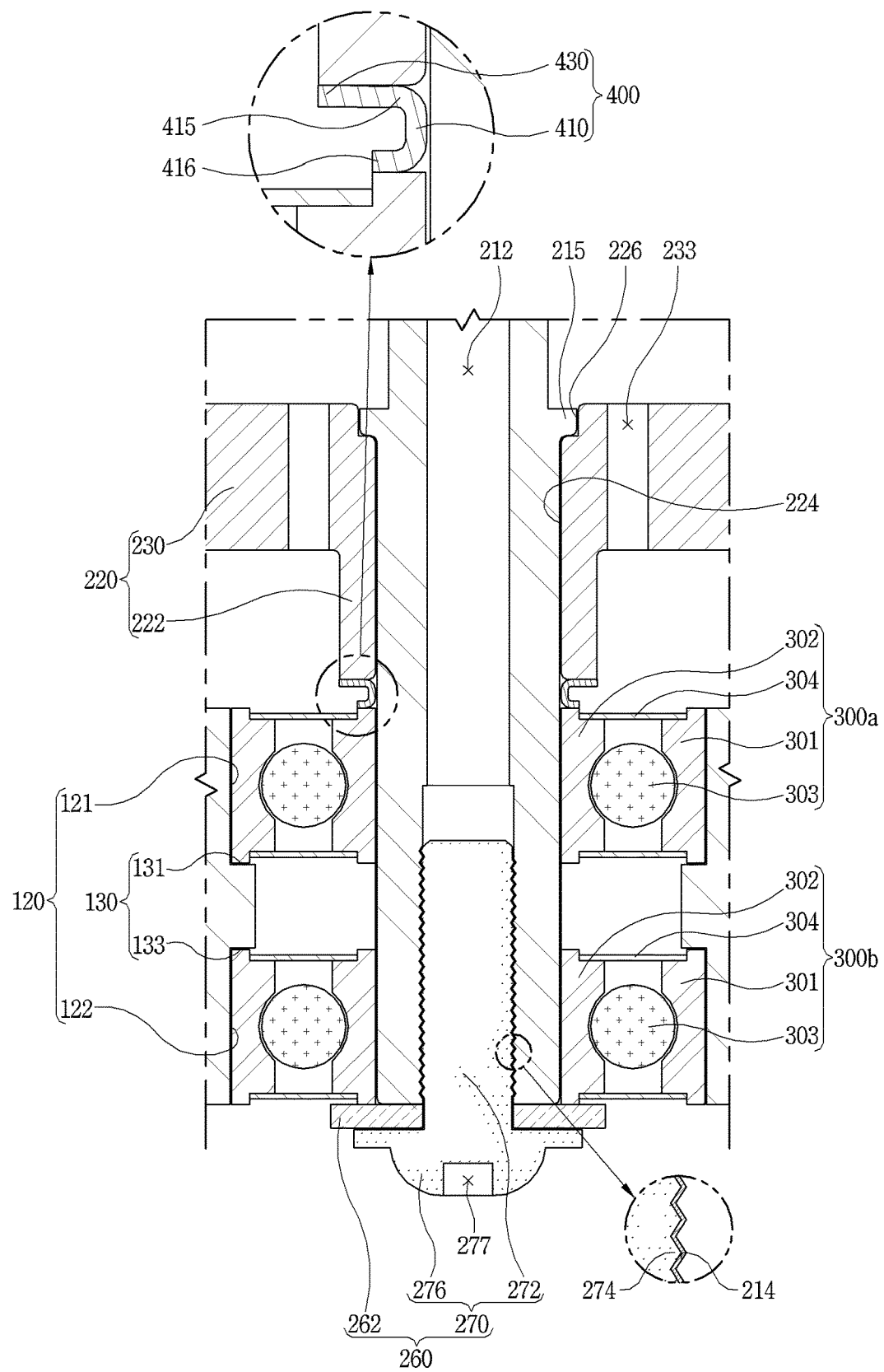
FIG. 2 is an enlarged view of a first preload washer region of FIG. 1.

FIG. 1 is a sectional view of an electric motor in accordance with one implementation of the present disclosure, and FIG. 2 is an enlarged view of a first preload washer region of FIG. 1. As illustrated in FIG. 1, an electric motor according to an implementation may include a stator 150, a rotor 200, a rotating shaft 210, a bearing 300, and a preload washer 400.

The electric motor according to the implementation may be implemented as a so-called outer rotor type motor in which the rotor 200 is rotatably provided outside the stator 150.

The stator 150 may be formed in a cylindrical shape.

A base member 110 may be disposed at an inner side of the stator 150.

The base member 110 may be formed in a cylindrical shape.

The stator 150 may be supported by the base member 110.

The stator 150 may include, for example, a stator core 160 and a stator coil 170 wound around the stator core 160.

The stator core 160 may include a plurality of teeth 165 spaced apart from one another in a circumferential direction.

The stator core 160 may include a plurality of slots 167 formed between the plurality of teeth 165.

The plurality of teeth 165 and slots 167 may alternately be disposed in the circumferential direction.

A base member accommodating portion 163 may be formed through the inside of the stator core 160 so that the base member 110 can be inserted in an axial direction.

The rotor 200 may include, for example, a rotating shaft 210 and a rotor frame 220 rotating centering on the rotating shaft 210.

The rotor 200 may include a permanent magnet 240 disposed on the rotor frame 220.

The permanent magnet 240 may, for example, be provided in plurality spaced apart from one another in the circumferential direction of the rotor frame 220.

The implementation exemplarily illustrates the case in which the permanent magnet 240 is provided in plurality spaced apart from one another in the circumferential direction, but this is merely illustrative and the present disclosure may not be limited to the case.

The permanent magnet 240 may be formed in a cylindrical shape, and disposed such that different magnetic poles (N pole and S pole) are alternately arranged in the circumferential direction.

The rotor frame 220 may include a permanent magnet supporting portion 245 for supporting the permanent magnets 240.

The permanent magnet supporting portion 245 may be formed, for example, in a cylindrical shape.

The permanent magnet supporting portion 245 may be made of a magnetic material to form a magnetic path, for example.

The permanent magnet supporting portion 245 may be formed by stacking a plurality of electrical steel sheets 247 having a circular ring shape in an insulating manner.

The plurality of permanent magnets 240 may be disposed, for example, on an inner surface of the permanent magnet supporting portion 245 to be spaced apart from one another at preset intervals.

A protruding end part 245a may be disposed on one end portion of the permanent magnet supporting portion 245 to protrude more in the axial direction as compared to one end of the permanent magnet 240.

The rotor frame 220 may include, for example, a rotating shaft coupling portion 222 into which the rotating shaft 210 is coupled, and a disk portion 230 extending from a circumference of the rotating shaft coupling portion 222 in a radial direction.

The rotating shaft coupling portion 222 may protrude from the disk portion 230 to one side (to a lower side in the drawing) in the axial direction.

A rotating shaft accommodating hole 224 may be formed through the rotating shaft coupling portion 222 in the axial direction such that the rotating shaft 210 can be accommodated.

The disk portion 230 may include, for example, a radial section 231 extending from the rotating shaft coupling portion 222 in the radial direction, and a shaft section 235 protruding from the radial section 231 in the axial direction.

A plurality of through-holes 233 may be formed through the disk portion 230 (the radial section 231) in the axial direction. Accordingly, the inside and the outside of the rotor frame 220 can communicate with each other.

A cut-out portion 237 may be formed by cutting out the shaft section 235 in the radial direction such that the permanent magnet supporting portion 245 can be coupled thereto.

The protruding end part 245a of the permanent magnet supporting portion 245 may be coupled to the cut-out portion 237 to be fixedly supported.

On the other hand, the rotating shaft 210 and the rotor frame 220 may be coupled to each other to be locked in the axial direction.

In a contact region between the rotating shaft 210 and the rotor frame 220, a protrusion 215 may protrude from one of the rotating shaft 210 and the rotor frame 220 in the radial direction, and an accommodating portion 226 for accommodating the protrusion 215 may be formed in another.

In the implementation, the protrusion 215 may protrude outward, for example, from an outer surface of the rotating shaft 210 in the radial direction and extend in the circumferential direction.

The accommodating portion 226 may be formed in a cylindrical shape to communicate with the rotating shaft accommodating hole 224 formed through the inside of the rotating shaft coupling portion 222, expand outward in the radial direction, and extend in the circumferential direction.

The accommodating portion 226 may be open to the outside in the axial direction.

Accordingly, the protrusion 215 may be accommodated in the accommodating portion 226 along the axial direction so as to be locked in one direction (an inserted direction).

The rotating shaft 210 may protrude to both sides of the rotor frame 220.

A plurality of rotating blades 140 may be provided at one end portion (an upper end portion in the drawing) of the rotating shaft 210.

The plurality of rotating blades 140 may protrude from a circumference of a hub 141 in the radial direction.

The hub 141 may be provided with a coupling portion 143 to be coupled to the rotating shaft 210. Although not specifically shown in the drawings, a coupling element may be disposed between the coupling portion 143 and the rotating shaft 210 such that the coupling portion 143 and the rotating shaft 210 can be coupled in the axial direction and locked in the circumferential direction.

A coupling member 260 may be screwed into another end portion (a lower end portion in the drawing) of the rotating shaft 210 to be movable relative to the rotating shaft 210.

The coupling member 260 may include, for example, a screw 270 having a male screw portion 274 and a washer 262 interposed between the screw 270 and the rotating shaft 210.

The screw 270 may include, for example, a body 272 having the male screw portion 274 on its outer surface and a head 276 extending from an end portion of the body 272.

The head 276 may be provided with a tool coupling portion 277 to which a tool can be coupled.

The tool coupling portion 277 may be recessed in the axial direction so that, for example, a screwdriver or a wrench can be inserted. The tool coupling portion 277 may be implemented as a recess having a "+" shape, a "−" shape, or a hexagonal shape in the axial direction, for example.

The rotating shaft 210 may, for example, be implemented in a shape of a hollow body (pipe) having a through-hole 212 formed therethrough in the axial direction.

A female thread portion 214 may be formed inside the rotating shaft 210 so that the screw 270 can be screwed.

The rotating shaft 210, for example, may be rotatably supported by a bearing 300.

The bearing 300, for example, may be provided in plurality spaced apart from one another in the axial direction.

The bearing 300 may include a first bearing 300a and a second bearing 300b spaced apart from each other along the axial direction.

The bearing 300 may be implemented as a ball bearing which includes, for example, an outer ring 301, an inner ring 302 concentrically disposed at an inner side of the outer ring 301, and a plurality of balls 303 disposed between the outer ring 301 and the inner ring 302.

Each of the first and second bearings 300a and 300b may be provided with, for example, sealing members 304 (shields or seals) for sealing both gaps between the outer ring 301 and the inner ring 302 in the axial direction. For example, a lubricant (grease) may be injected into the outer ring 301, the inner ring 302, and the sealing members 304, for example.

Here, the bearing 300 (each of the first bearing 300a and the second bearing 300b) may be press-fitted to have an axial clearance (hereinafter, referred to as 'post-assembly-clearance') after assembling the outer ring 301, the ball 303, and the inner ring 302.

The bearing 300 (each of the first bearing 300a and the second bearing 300b) may also have a clearance (hereinafter, referred to as 'post-coupling-clearance') to which a preset preload is applied after coupling the preload washer 400.

More specifically, for example, the post-assembly-clearance may be a relatively small clearance as the outer ring 301, the ball 303, and the inner ring 302 are pressed in the axial direction.

The post-coupling-clearance may be a more increased clearance than the post-assembly-clearance to allow smooth rotation of the outer ring 301, the ball 303, and the inner ring 302 after the preload is applied.

Accordingly, the outer ring 301, the ball 303, and the inner ring 302 of the bearing 300 can have a clearance (i.e., the post-coupling-clearance) suitable for rotation, thereby suppressing an increase in forced wear of the outer ring 301, the ball 303 and the inner ring 302 due to the change in (reduction of) the clearance of the bearing 300.

On the other hand, a bearing accommodating portion 120 for accommodating the bearing 300 may be disposed in the base member 110.

The bearing accommodating portion 120 may include a first bearing accommodating portion 121 for accommodating the first bearing 300a.

The bearing accommodating portion 120 may include a second bearing accommodating portion 122 for accommodating the second bearing 300b.

In the implementation, the bearing 300 may be press-fitted into the bearing accommodating portion 120.

Accordingly, the outer ring 301 of the bearing 300 may be fixedly brought into contact with an inner surface of the bearing accommodating portion 120.

A bearing outer ring supporting part 130 for supporting the outer ring 301 of the bearing 300 in the axial direction may be provided inside the base member 110.

In the implementation, the bearing outer ring supporting part 130 may be disposed between the first bearing 300a and the second bearing 300b in the axial direction.

The bearing outer ring supporting part 130 may prevent the outer ring 301 of the first bearing 300a and the outer ring 301 of the second bearing 300b from approaching each other in the axial direction.

The bearing outer ring supporting part 130 may include a first bearing outer ring supporting portion 131 for supporting the outer ring 301 of the first bearing 300a.

The bearing outer ring supporting part 130 may further include, for example, a second bearing outer ring supporting portion 133 for supporting the outer ring 301 of the second bearing 300b.

The first bearing outer ring supporting portion 131 may be located on one side (a lower side in the drawing) of the outer ring 301 of the first bearing 300a in the axial direction, for example.

Accordingly, the first bearing outer ring supporting portion 131 can prevent the outer ring 301 of the first bearing 300a from moving downward in the axial direction.

The second bearing outer ring supporting portion 133 may be located on one side (an upper side in the drawing) of the outer ring 301 of the second bearing 300b in the axial direction, for example.

Accordingly, the second bearing outer ring supporting portion 133 can prevent the outer ring 301 of the second bearing 300b from moving upward in the axial direction.

On the other hand, the preload washer 400 may include a rotating shaft hole 412 for accommodating the rotating shaft 210, a shaft section 410 having a preset fixed length L1 in the axial direction, and an elastically-deformable portion 430 extending from one end portion of the shaft section 410 to be elastically deformable.

The preload washer 400 may be disposed to apply a preset intensity of preload to the inner ring 302 of the first bearing 300a or the inner ring 302 of the second bearing 300b.

Here, the elastically-deformable portion 430 of the preload washer 400 may have a free length Lf before the preload is applied.

The elastically-deformable portion 430 may extend from one end portion of the shaft section 410 in the axial direction.

More specifically, the elastically-deformable portion 430 may be configured such that a total length Lt of the preload washer 400 in the axial direction is increased compared to the fixed length L1.

In addition, the elastically-deformable portion 430 may be configured to overlap the fixed length of the shaft section 410 of the preload washer 400. In this case, the total length of the preload washer 400 in the axial direction may be the same as the fixed length.

More specifically, the preload washer 400 may be disposed to come in contact with the inner ring 302 of the first bearing 300a or the inner ring 302 of the second bearing 300b to apply a preset intensity of preload to the inner ring 302 of the first bearing 300a or the inner ring 302 of the second bearing 300b.

Hereinafter, a process in which the preload washer 400 having such configuration is coupled and applies a preload when coupling the coupling member 260 will be described.

The rotor frame 220 and the rotating shaft 210 may be coupled to each other to be locked in the axial direction, and the coupling member 260 may be screwed into an end portion (a lower end portion in the drawing) of the rotating shaft 210.

The first bearing 300a and the second bearing 300b may be disposed with being spaced apart from each other between the rotor frame 220 and the coupling member 260 in the axial direction, and the preload washer 400 may be disposed to come in contact with the inner ring 302 of the first bearing 300a or the inner ring 302 of the second bearing 300b to which the preload is to be applied.

The coupling member 260 may be screwed into the end portion (the lower end portion in the drawing) of the rotating shaft 210, and rotated in a direction in which the coupling member 260 and the rotor frame 220 approach each other.

When the coupling member 260 is rotated relative to the rotating shaft 210, a distance between the rotor frame 220 and the coupling member 260 may be reduced. Accordingly, the preload washer 400 may be contracted in the axial direction and accumulate elastic energy.

The preload washer 400 can apply a preset intensity of preload to the inner ring 302 of the first bearing 300a or the inner ring 302 of the second bearing 300b in contact with it by pressing the same with the accumulated elastic energy.

Here, the elastically-deformable portion 430 of the preload washer 400 can exhibit a significantly greater axial displacement than an axial displacement of the rotor frame 220 when thrust is applied in response to the rotation of the plurality of rotating blades 140. Accordingly, even if the axial displacement of the rotor frame 220 is caused due to the thrust of the plurality of rotating blades 140, the preload washer 400 can be maintained in an elastically-deformed state. With the configuration, a preset intensity of preload can be continuously applied to the inner ring 302 of the bearing in contact with the preload washer 400.

A preset clearance among the outer ring 301, the ball 303, and the inner ring 302 of the bearing 300 can be stably maintained by the preload of the preload washer 400, thereby preventing a decrease in the clearance. This may result in suppressing an occurrence of forced wear of the outer ring 301, the ball 303, and the inner ring 302 due to the decrease in the clearance. Accordingly, the useful life of the bearing 300 may be increased.

In the implementation, the preload washer 400 may include a first preload washer 400 disposed between the rotor frame 220 and the inner ring 302 of the first bearing 300a to apply a preset intensity of preload to the inner ring 302 of the first bearing 300a. Here, since the first preload washer 400 has substantially the same configuration as the preload washer 400, the same reference numerals are assigned to the drawings for convenience of description.

As illustrated in FIG. 2, after the coupling member 260 is coupled, one end portion (a lower end portion in the drawing) of the first preload washer 400 may be brought into contact with the inner ring 302 of the first bearing 300a and another end portion (an upper end portion in the drawing) may be brought into contact with a lower end of the rotor frame 220.

Figure 3:
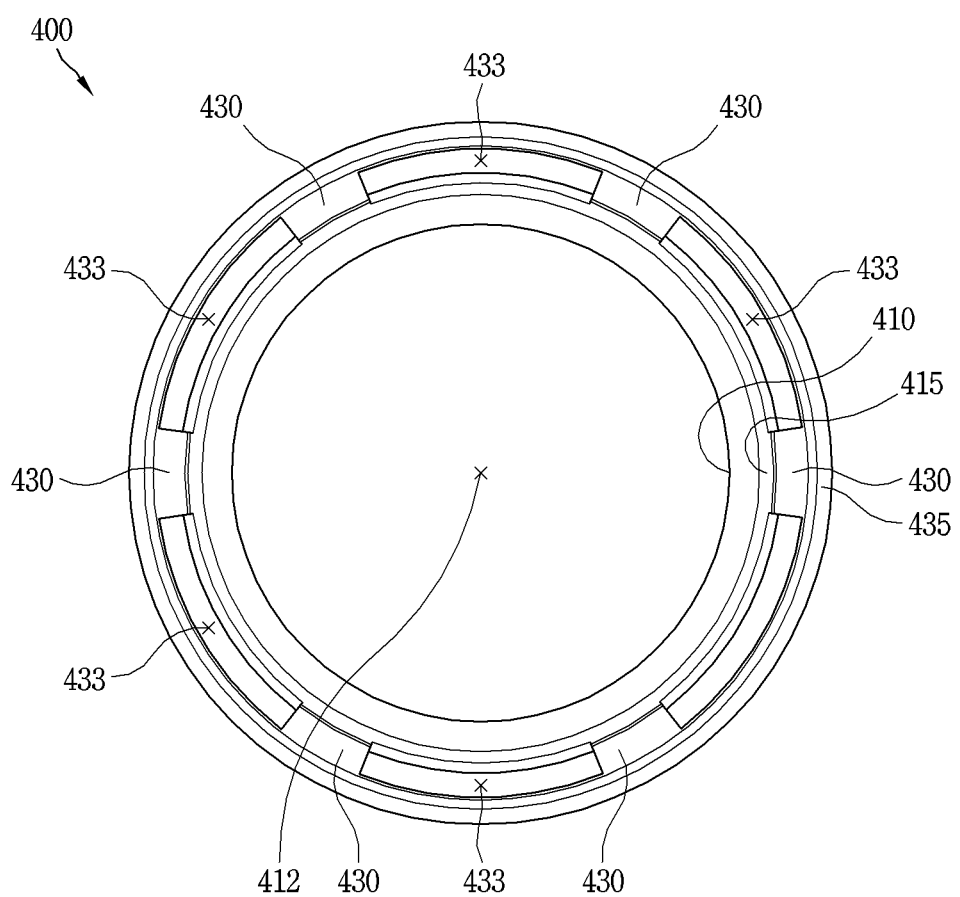
FIG. 3 is a planar view of a preload washer of FIG. 1.
Figure 4:
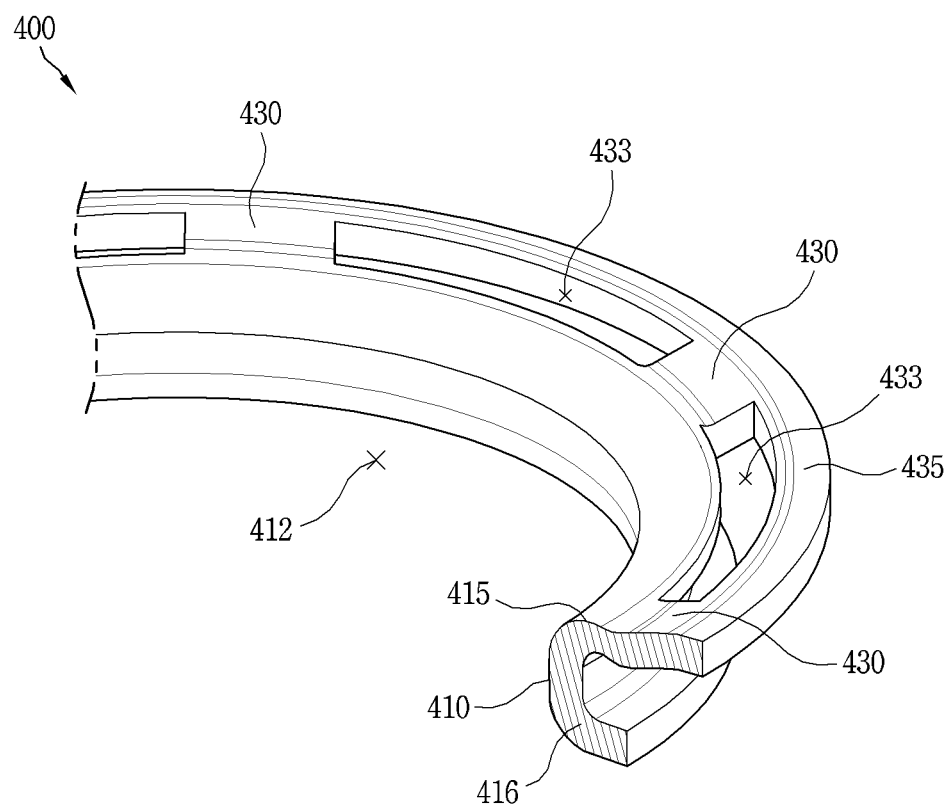
FIG. 4 is a partially-cut sectional view of the preload washer of FIG. 3.
Figure 5:
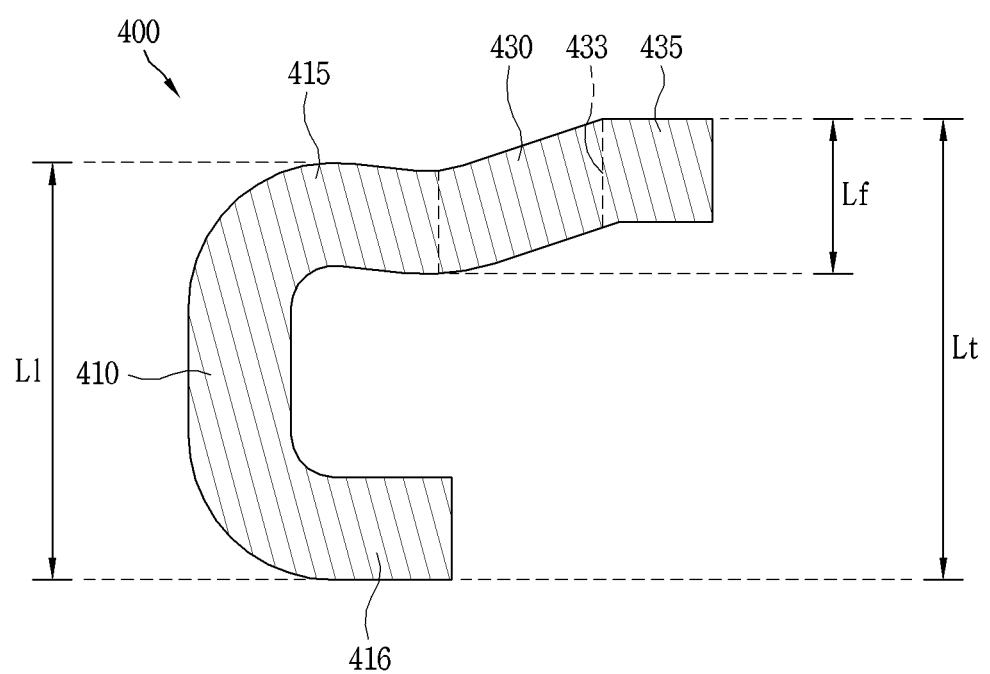
FIG. 5 is an enlarged sectional view of the preload washer of FIG. 4.

FIG. 3 is a planar view of the preload washer of FIG. 1, FIG. 4 is a partially-cut sectional view of the preload washer of FIG. 3, and FIG. 5 is an enlarged sectional view of the preload washer of FIG. 4. As illustrated in FIGS. 3 to 5, the first preload washer 400 may include a shaft section 410 with a fixed length in the axial direction, and having one end portion brought into contact with the inner ring 302 of the first bearing 300a and another end portion contactable with the rotor frame 220, and an elastically-deformable portion 430 extending from an end portion of the shaft section 410 in the radial direction and the axial direction, respectively, so as to have a free length (axial length).

Specifically, as illustrated in FIG. 3, the shaft section 410 may include a rotating shaft hole 412 formed in a penetrating manner in the axial direction so that the rotating shaft 210 can be accommodated.

As illustrated in FIG. 4, the shaft section 410 may be provided with contact portions 415 and 416 radially protruding from both end portions in the axial direction and extending in the circumferential direction, respectively.

Here, the contact portion 416 provided on one end portion (a lower end portion in the drawing) in the axial direction of the shaft section 410 may be referred to as an inner ring contact portion 416 in that it comes in contact with the inner ring 302 of the first bearing 300a.

The contact portion 415 provided on another end portion (an upper end portion in the drawing) of the shaft section 410 may be referred to as a stopper 415 in that it is brought into contact with the rotor frame 220 (actually, the rotating shaft coupling portion 222) after the coupling member 260 is coupled and limits the coupling of the coupling member 260 (the screw 270).

The elastically-deformable portion 430 that is elastically deformable in the axial direction may extend outward from the contact portion 415 disposed on the upper end portion of the shaft section 410 in the radial direction and the axial direction, respectively.

In the implementation, the fixed length may mean an axial length from the one end portion (the inner ring contact portion 416) of the shaft section 410 to the another end portion (the stopper 415) in the axial direction.

The free length may mean a length (free length) from the one end portion (the inner ring contact portion 416) of the shaft section 410 to an end portion (free end portion) of the elastically-deformable portion 430 before elastic deformation of the first preload washer 400 in the axial direction.

Referring to FIGS. 2 and 3 together, the elastically-deformable portion 430 may be provided in plurality spaced apart from one another in the circumferential direction of the rotor 200. The implementation illustrates six elastically-deformable portions 430, but this is merely illustrative and the present disclosure may not be limited to this.

Slots 433 may be formed in a penetrating manner between adjacent elastically-deformable portions 430 in the circumferential direction. In the implementation, the slots 433 may be provided in the same number as the number of the elastically-deformable portions 430.

The first preload washer 400 may include an annular portion 435 formed in a ring shape to connect end portions of the plurality of elastically-deformable portions 430.

Here, the annular portion 435 in the implementation may be referred to as a rotor frame contact portion 435 in that it is in contact with the rotor frame 220.

Figure 6:
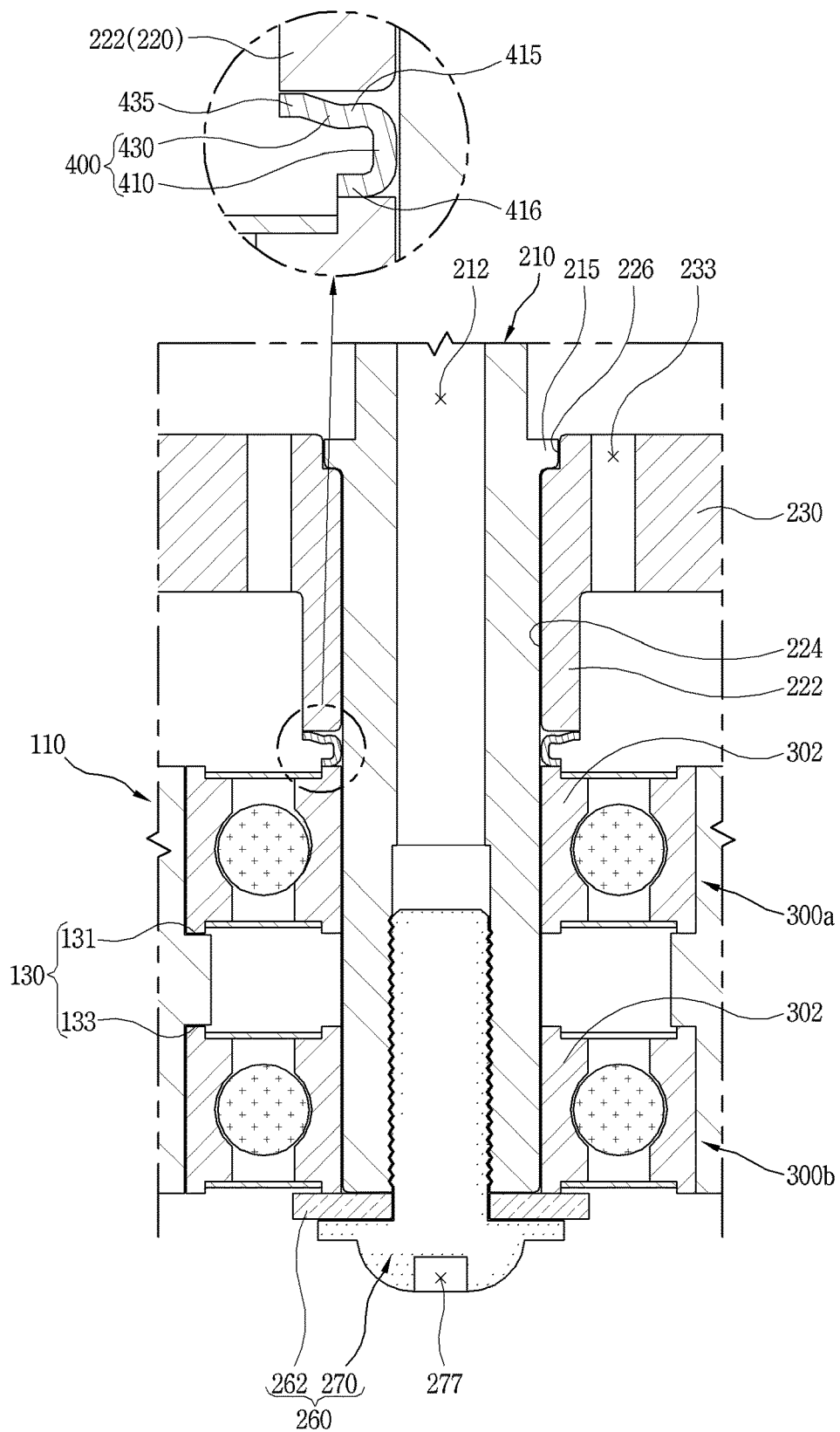
FIG. 6 is a view illustrating a free length at the beginning of coupling the preload washer of FIG. 2.
Figure 7:
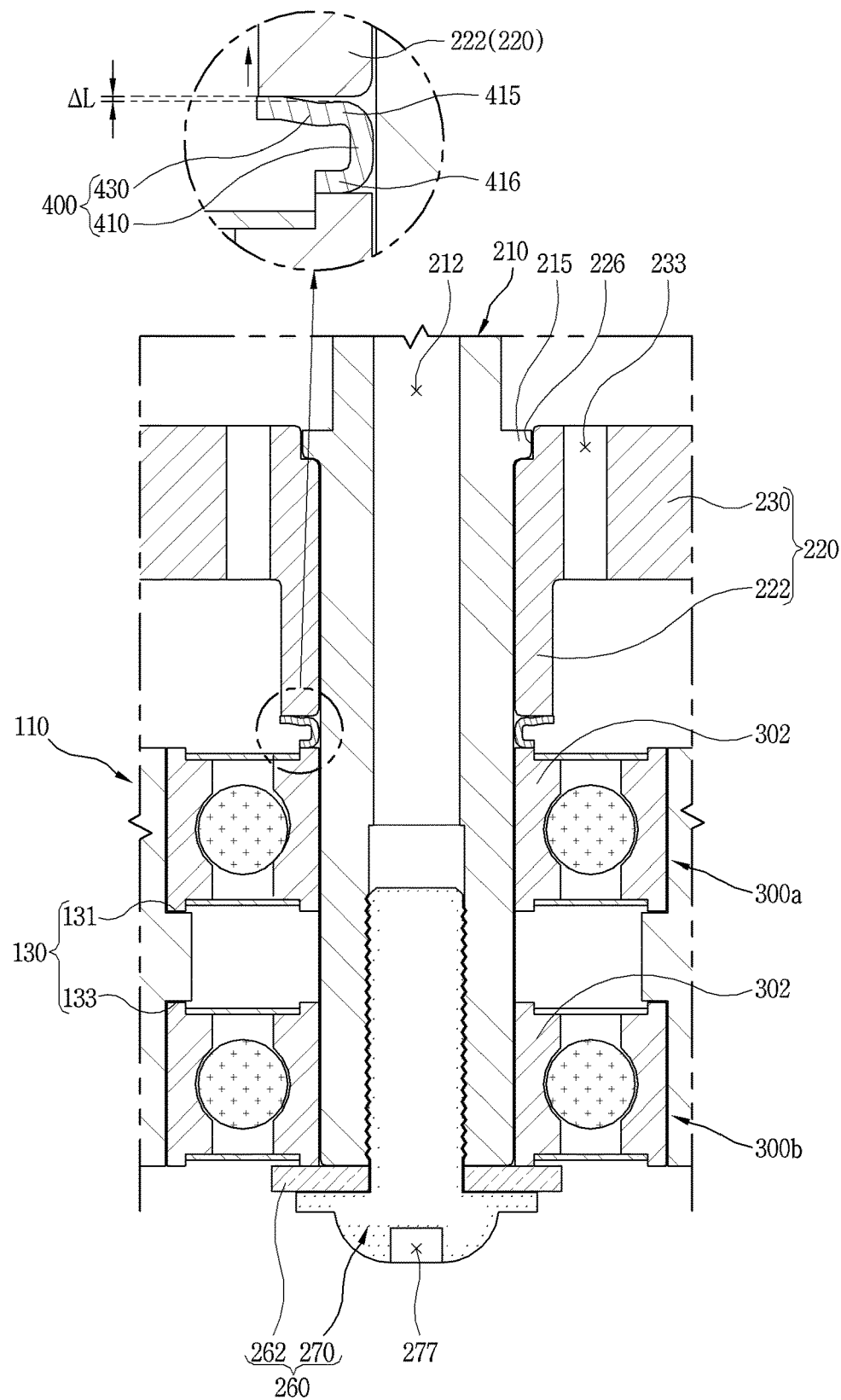
FIG. 7 is a view illustrating a state when thrust of the preload washer of FIG. 2 is applied.

FIG. 6 is a view illustrating a free length at the beginning of coupling the preload washer of FIG. 2, and FIG. 7 is a view illustrating a state when thrust of the preload washer of FIG. 2 is applied. As illustrated in FIG. 6, the first preload washer 400 may be inserted between the first bearing 300a and the rotor frame 220 in the axial direction.

More specifically, the stator 150 may be coupled to the base member 110 and the first bearing 300a and the second bearing 300b may be accommodated inside the base member 110.

The rotor frame 220 may be coupled to the rotating shaft 210 and the first preload washer 400 may be coupled to the rotor frame 400.

At this time, the first preload washer 400 may be coupled to be brought into contact with the rotating shaft coupling portion 222 of the rotor frame 220.

Next, the rotating shaft 210 may be inserted into the inner ring 302 of the first bearing 300a and the inner ring 302 of the second bearing 300b.

When the coupling of the rotating shaft 210 is completed, the coupling member 260 may be coupled to the end portion of the rotating shaft 210.

The washer 262 of the coupling member 260 may first be coupled and then the screw 270 may be screwed into the female thread portion 214 of the rotating shaft 210.

On the other hand, at the beginning of coupling the coupling member 260, namely, before the elastically-deformable portion 430 is elastically deformed, one end (a lower end in the drawing) of the first preload washer 400 may be brought into contact with the inner ring 302 of the first bearing 300a and another end (an upper end in the drawing) may be simply brought into contact with the lower end of the rotating shaft coupling portion 222 of the rotor frame 220.

At this time, when the coupling member 260 is rotated in a direction in which the rotor frame 220 and the coupling member 260 approach each other, the screw 270 may be relatively moved into the rotating shaft 210.

Accordingly, an axial interval (distance) between the coupling member 260 and the protrusion 215 of the rotating shaft 210 may be shortened and the elastically-deformable portion 430 of the first preload washer 400 in contact with the lower end of the rotor frame 220 (the rotating shaft coupling portion 222) may be compressed and elastically deformed in the axial direction so as to accumulate elastic energy.

When the screw 270 is continuously rotated, as illustrated in FIG. 2, the elastically-deformable portion 430 of the first preload washer 400 may be elastically deformed to a substantially horizontal state, and the stopper 415 of the first preload washer 400 may be brought into contact with the rotating shaft coupling portion 222.

Accordingly, the rotation of the screw 270 in the axial direction may be suppressed and the coupling of the coupling member 260 may be completed.

On the other hand, when an operation is started and power is applied to the stator coil 170, the rotor 200 may rotate centering on the rotating shaft 210 by interaction between a magnetic field formed by the stator coil 170 and a magnetic field of the permanent magnets 240.

When the plurality of rotating blades 140 is rotated together with the rotating shaft 210, lift may be generated and thrust may be applied to the rotor frame 220 and the rotating shaft 210 toward one side (an upper side in the drawing) in the axial direction.

Accordingly, the rotor frame 220 may be moved in the thrust direction (the upward direction in the drawing), and the first preload washer 400 may be expanded upward by a minute displacement ΔL to correspond to a displacement of the rotor frame 220 while being elastically in contact with the rotor frame 220 in the axial direction.

At this time, the first preload washer 400 may be maintained in the elastically deformed state, so as to elastically press the inner ring 302 of the first bearing 300 by the accumulated elastic energy, thereby applying a preset intensity of preload to the inner ring 302.

Accordingly, the initially aligned state among the outer ring 301, the ball 303, and the inner ring 302 of the first bearing 300a can be maintained, and an initial clearance among the outer ring 301, the ball 303, and the inner ring 302 can also be maintained.

This may result in suppressing an occurrence of forced wear of the outer ring 301, the ball 303, and the inner ring 302 due to a decrease in the clearance among the outer ring 301, the ball 303, and the inner ring 302.

Therefore, the useful life of the bearing 300 can be extended.

Figure 8:
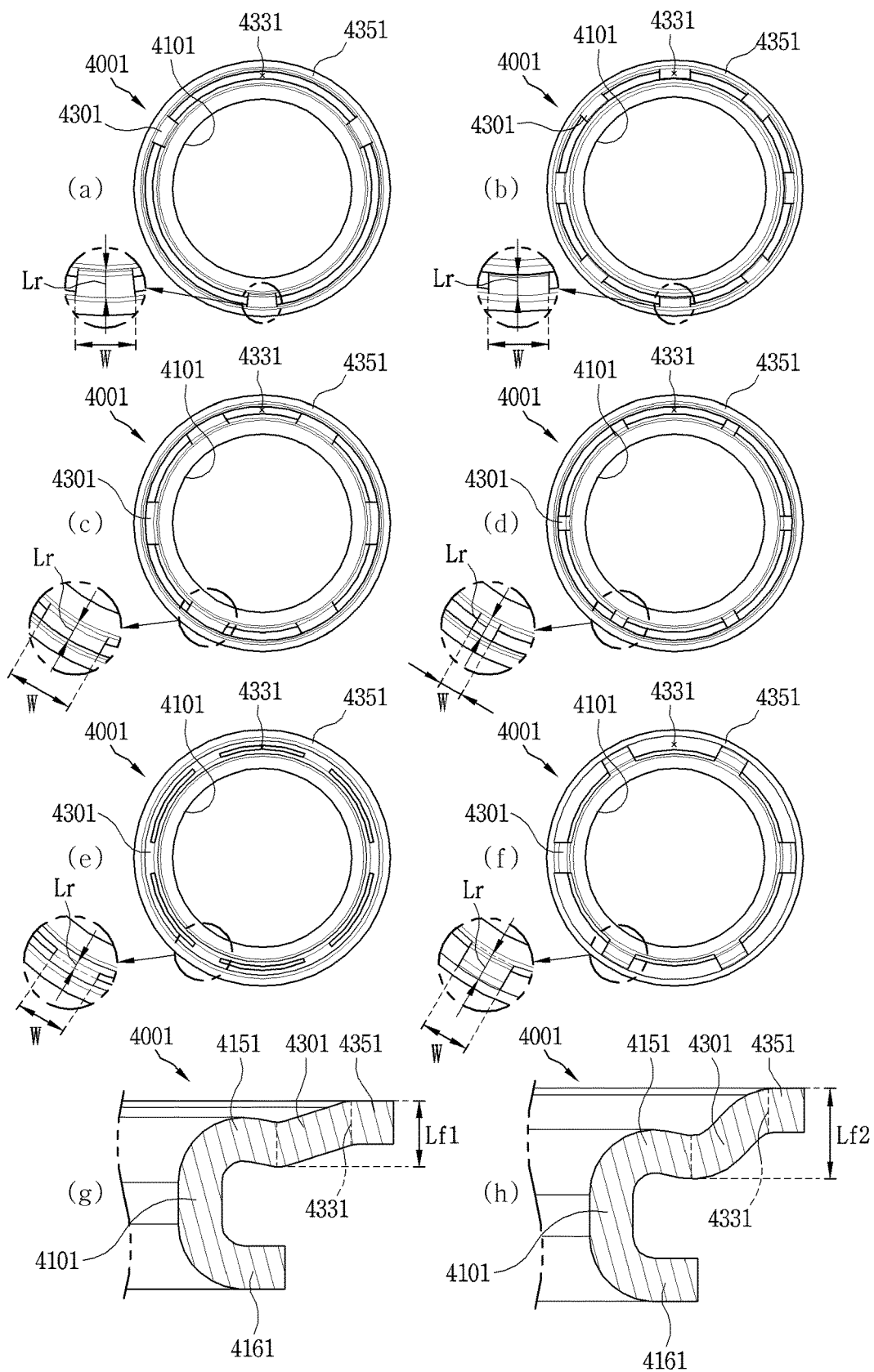
FIG. 8 is a view of a preload washer of an electric motor in accordance with another implementation of the present disclosure.

FIG. 8 is a view of a preload washer of an electric motor in accordance with another implementation of the present disclosure. A preload washer 4001 according to an implementation may include a rotating shaft hole 4121 for accommodating the rotating shaft 210, a shaft section 4101 having a preset fixed length in the axial direction, and an elastically-deformable portion 4301 extending from one end portion of the shaft section 4101 to be elastically deformable.

The preload washer 4001 may be disposed to apply a preset intensity of preload to the inner ring 302 of the first bearing 300a or the inner ring 302 of the second bearing 300b in the axial direction.

Contact portions 4151 and 4161 may be disposed on upper end and lower end portions of the shaft section 4101 in the axial direction, respectively.

The elastically-deformable portion 4301 of the preload washer 4001 may be provided in plurality, for example, spaced apart from one another in the circumferential direction, as illustrated in FIG. 8.

The plurality of elastically-deformable portions 4301 may be three in number, for example, as illustrated in (a) of FIG. 8.

In addition, the plurality of elastically-deformable portions 4301, for example, may be eight in number as illustrated in (b) of FIG. 8, or six in number as illustrated in (c) to (f) of FIG. 8.

Here, the preload washer 4001 may include an annular portion 4351 having a ring shape to connect end portions (outer end portions) of the plurality of elastically-deformable portions 4301 in the circumferential direction.

The preload washer 4001 may include slots 4331 formed in a penetrating manner between two adjacent elastically-deformable portions 4301 in the circumferential direction.

Here, the plurality of elastically-deformable portions 4301 and the slots 4331 may be alternately formed with each other in the circumferential direction, and the slots 4331 are formed in the same number as the number of the plurality of elastically-deformable portions 4301.

A width (circumferential width w), a radial length Lr, and the number of the plurality of elastically-deformable portions 4301 may differ depending on an intensity of preload to be applied.

In addition, the plurality of elastically-deformable portions 4301 may be implemented to have a different free length (axial length) in consideration of an intensity of preload to be applied.

The plurality of elastically-deformable portions 4301 may have a first free length Lf1, for example, as illustrated in (g) of FIG. 8.

The plurality of elastically-deformable portions 4301 may have a second free length Lf2 which is more increased than the first free length Lf1 in the axial direction, for example, as illustrated in (h) of FIG. 8.

According to one implementation of the present disclosure, the number, circumferential width, and axial length of the elastically-deformable portions 430 can be appropriately changed and adjusted to correspond to the intensity of preload to be applied to the inner ring 302 of the bearing 300, thereby facilitating manufacturing of the preload washer 4001.

Figure 9:
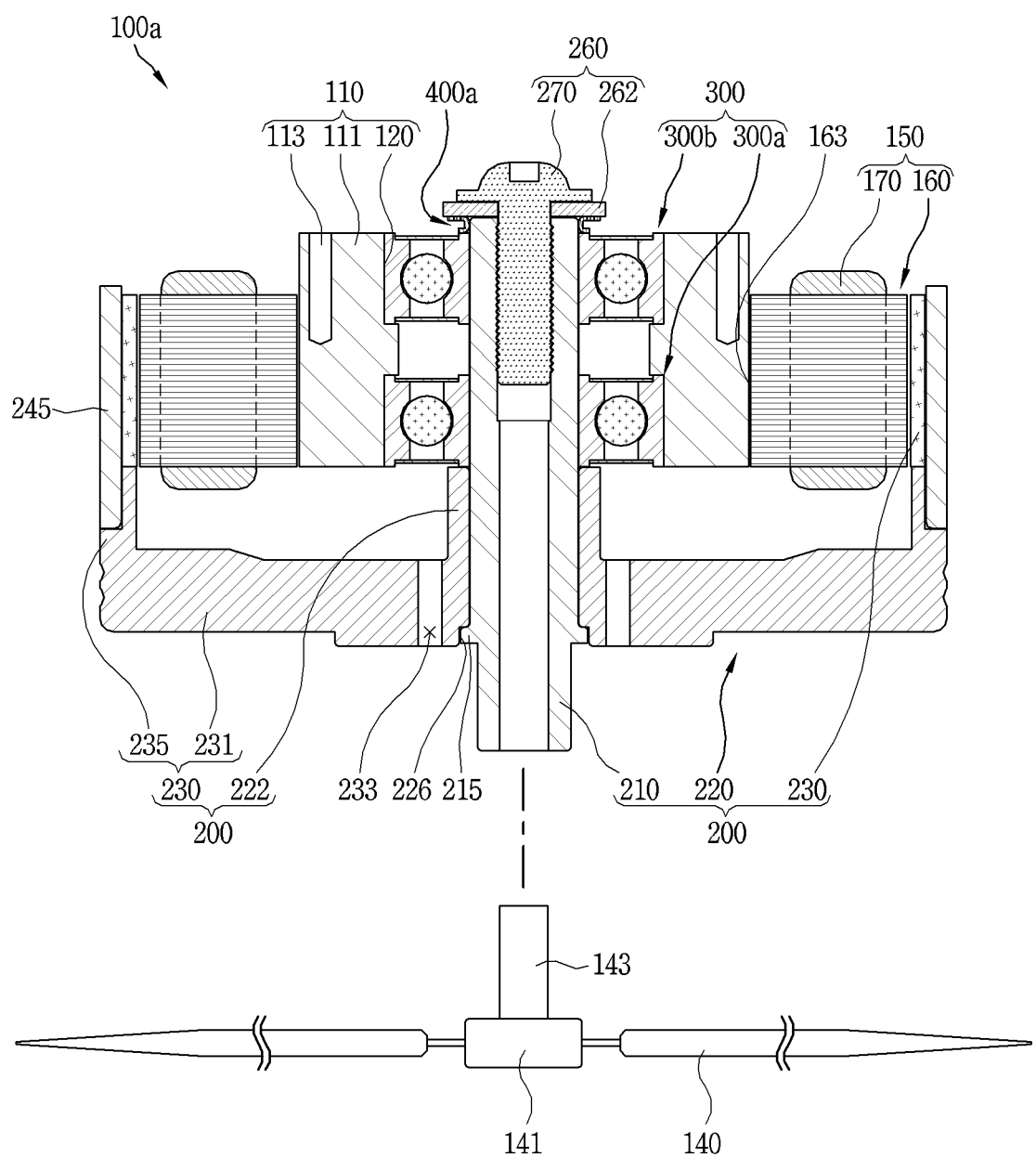
FIG. 9 is a sectional view of an electric motor in accordance with another implementation of the present disclosure.
Figure 10:
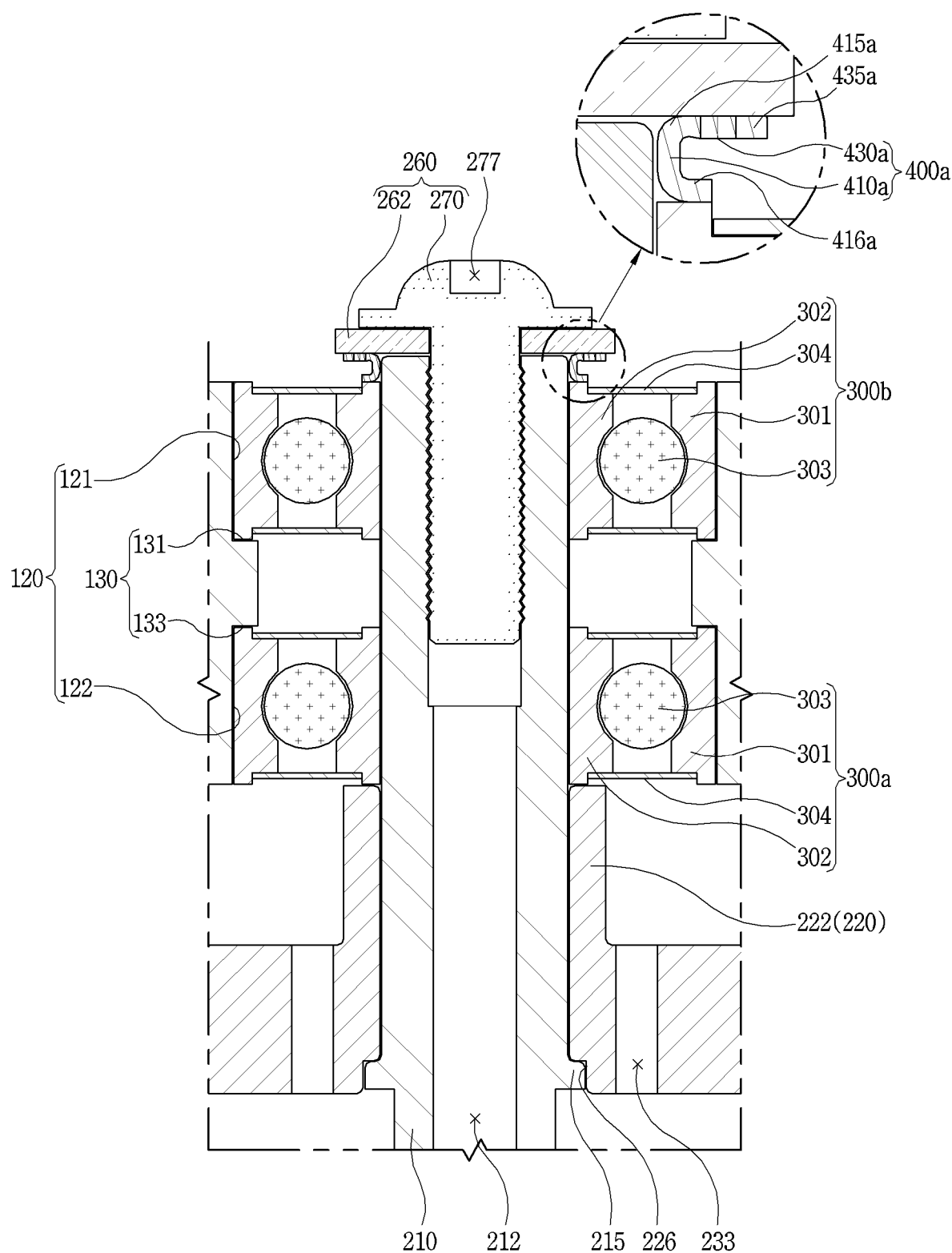
FIG. 10 is an enlarged view of a second preload washer region of FIG. 9.
Figure 11:
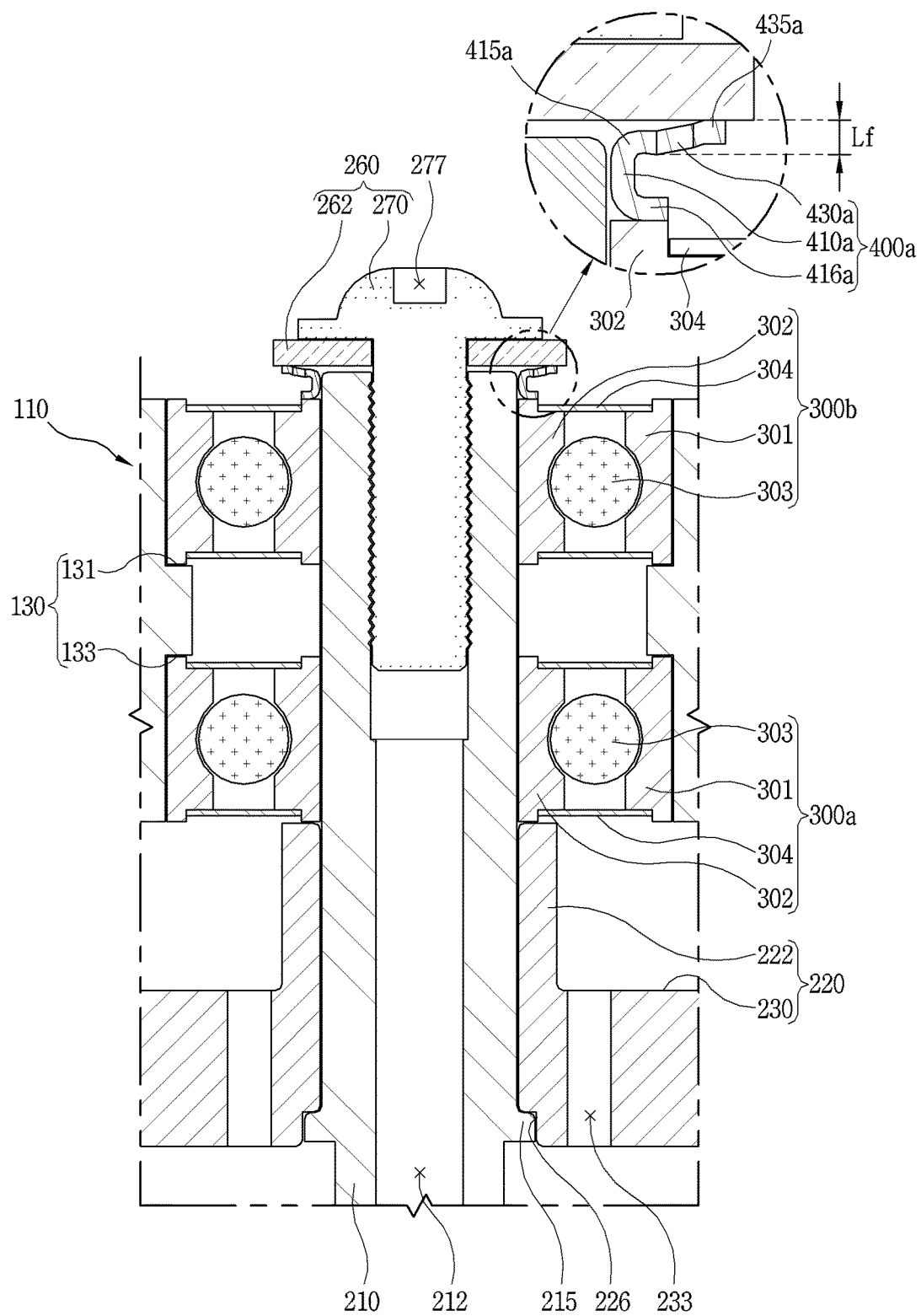
FIG. 11 is a view illustrating a free length at the beginning of coupling a second preload washer of FIG. 9.
Figure 12:
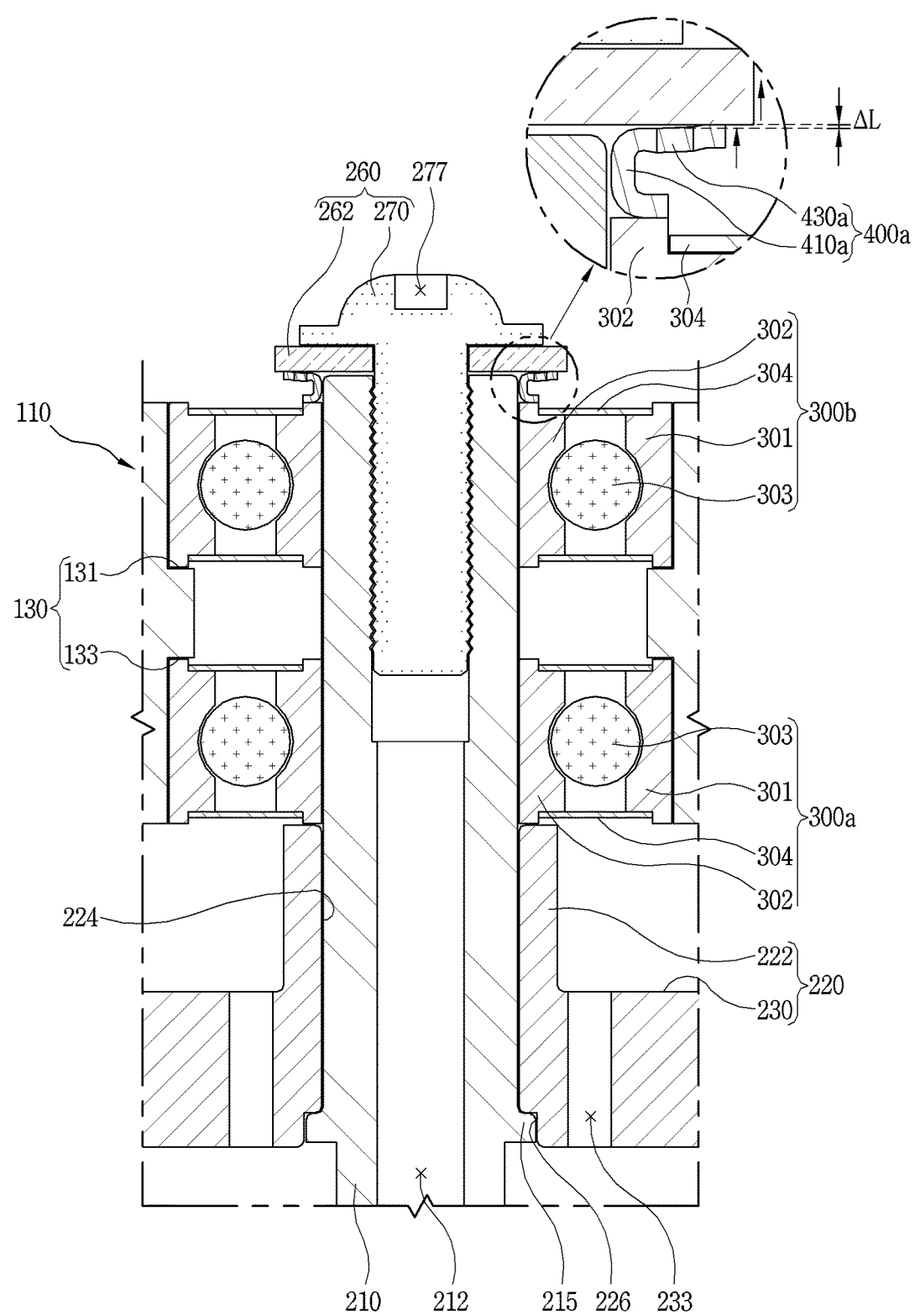
FIG. 12 is a view illustrating a state after thrust of the second preload washer of FIG. 9 is applied.

FIG. 9 is a sectional view of an electric motor in accordance with another implementation of the present disclosure, FIG. 10 is an enlarged view of a second preload washer region of FIG. 9, FIG. 11 is a view illustrating a free length at the beginning of coupling the second preload washer of FIG. 9, and FIG. 12 is a view illustrating a state after thrust of the second preload washer of FIG. 9 is applied. As illustrated in FIGS. 9 and 10, an electric motor 100a according to an implementation may include a stator 150, a rotor 200, a rotating shaft 210, a bearing 300, and a second preload washer 400a.

The stator 150 may include, for example, a stator core 160 and a stator coil 170 wound around the stator core 160. A base member 110 may be disposed at an inner side of the stator 150. The stator 150 may be supported by the base member 110.

The rotor 200 may include, for example, a rotating shaft 210, a rotor frame 220 coupled to the rotating shaft 210, and permanent magnets 240 coupled to the rotor frame 220. The rotating shaft 210 may protrude to both sides of the rotor 200.

A plurality of rotating blades 140 may be provided at one end portion (a lower end portion in the drawing) of the rotating shaft 210. The plurality of rotating blades 140 may be configured, for example, to generate lift toward one side (an upper side in the drawing) in the axial direction during rotation.

The rotor frame 220 may include a rotating shaft coupling portion 222 in which the rotating shaft 210 can be accommodated. A rotating shaft accommodating hole 224 may be formed through the inside of the rotating shaft coupling portion 222 in the axial direction. The rotating shaft 210 and the rotor frame 220 may be coupled to each other to be locked in the axial direction.

More specifically, the rotating shaft 210 may be provided with a protrusion 215 protruding in the radial direction. The rotor frame 220 may include an accommodating portion 226. The protrusion 215 may be accommodated in the accommodating portion 215 to be engaged with the same in the axial direction.

A coupling member 260 may be provided in another end portion (an upper end portion in the drawing) of the rotating shaft 210. The coupling member 260 may include, for example, a washer 262 and a screw 270 screwed into the rotating shaft 210. A female thread portion 214 may be formed inside the rotating shaft 210 so that the screw 270 can be screwed.

The rotating shaft 210 may be rotatably supported by a first bearing 300a and a second bearing 300b spaced apart from each other in the axial direction. The first bearing 300a may be, for example, disposed adjacent to the rotor frame 220. The second bearing 300b may be, for example, disposed to be spaced apart from the rotor frame 220.

The first bearing 300a may be disposed on one side of the rotating shaft coupling portion 222 in the axial direction, and the second bearing 300b may be disposed at one side of the first bearing 300a in a spaced manner.

The first bearing 300a and the second bearing 300b each may include an outer ring 301, an inner ring 302 concentrically disposed at an inner side of the outer ring 301, and a plurality of balls 303 disposed between the outer ring 301 and the inner ring 302. Each of the first bearing 300a and the second bearing 300b may be provided with sealing members 304 (shields or seals) disposed on both sides in the axial direction.

The first bearing 300a and the second bearing 300b may be press-fitted into the bearing accommodating portion 120. At this time, the outer ring 301 of each of the first bearing 300a and the second bearing 300b may be supported in the axial direction by the first bearing outer ring supporting portion 131 and the second bearing outer ring supporting portion 133 of the base member 110.

Here, the rotating shaft coupling portion 222 may be coupled to be in contact with the inner ring 302 of the first bearing 300a.

On the other hand, a second preload washer 400a that can apply a preset intensity of preload to the inner ring 302 of the second bearing 300b may be disposed between the coupling member 260 and the second bearing 300b.

For example, as illustrated in FIG. 11, the second preload washer 400a may include a shaft section 410a with a fixed length in the axial direction, and having one end portion brought into contact with the inner ring 302 of the second bearing 300b and another end portion contactable with the coupling member 260, and an elastically-deformable portion 430a extending from an end portion of the shaft section 410a in the radial direction and the axial direction, respectively, so as to have a free length.

The shaft section 410a of the second preload washer 400a may have the fixed length in the axial direction. Contact portions 415a and 416a may respectively protrude from both end portions of the shaft section 410a in the radial direction and extend in the circumferential direction.

The contact portion 415a provided on one end portion (an upper end portion in the drawing) of the shaft section 410a may be referred to as a stopper 415a in that it comes in contact with the coupling member 260 to limit the coupling of the coupling member 260.

The contact portion 416a provided on another end portion (a lower end portion in the drawing) of the shaft section 410a may be referred to as an inner ring contact portion 416a in that it comes in contact with the inner ring 302 of the first bearing 300a.

A rotating shaft hole 412a may be formed through the inside of the shaft section in the axial direction so that the rotating shaft 210 can be accommodated.

The elastically-deformable portion 430a of the second preload washer 400a may be provided in plurality spaced apart from one another in the circumferential direction of the rotor 200.

The second preload washer 400a may include, for example, an annular portion 435a having a ring shape to connect end portions of the plurality of elastically-deformable portions 430a. Here, the annular portion 435a may be referred to as a coupling member contact portion 435a in that it is in contact with the coupling member 260.

The second preload washer 400a may include slots 433a formed in a penetrating manner between two adjacent elastically-deformable portions 430a in the circumferential direction.

With this configuration, the stator 150 may be coupled to the outside of the base member 110, and the rotor frame 220 may be coupled to the rotating shaft 210. The first bearing 300a and the second bearing 300b may be accommodated in the base member 110, respectively. The rotating shaft 210 may be inserted into the inner ring 302 of the first bearing 300a and the inner ring 302 of the second bearing 300b.

On the other hand, the second preload washer 400a may be coupled to the end portion (the upper end portion in the drawing) of the rotating shaft 210 which is inserted through the inner ring 302 of the second bearing 300b.

Here, the second preload washer 400a may be coupled such that the inner ring contact portion 416a of the shaft section 410a is brought into contact with the inner ring 302 of the second bearing 300b.

Next, when the coupling of the second preload washer 400a is completed, the coupling member 260 (the washer 260 and the screw 270) may be coupled.

When the screw 270 is rotated in a direction in which the rotor frame 220 and the coupling member 260 are close to each other, the coupling member 260 may be inserted into the rotating shaft 210 and the rotor frame 220 may be relatively moved toward the coupling member 260.

Accordingly, the inner ring 302 of the first bearing 300a may be pressed to one side (an upper side in the drawing) in the axial direction, and the inner ring 302 of the second bearing 300b may be pressed to another side (a lower side in the drawing) in the axial direction. Accordingly, the elastically-deformable portion 430a of the second preload washer 400a can accumulate elastic energy while being compressed in the axial direction.

When the screw 270 is continuously rotated, the elastically-deformable portion 430a may become substantially horizontal as illustrated in FIG. 10, and the stopper 415a of the shaft section 410a may be brought into contact with the washer 262. Accordingly, the rotation of the screw 270 may be suppressed and the coupling of the coupling member 260 may be completed.

On the other hand, when the operation is started and power is applied to the stator coil 170, the rotor 200 may be rotated centering on the rotating shaft 210. When the rotating shaft 210 and the plurality of rotating blades 140 are rotated together with the rotating shaft 210, thrust may be applied to the rotating shaft 210 toward one side (an upper side in the drawing) in the axial direction.

The coupling member 260 (the washer 262) may be slightly displaced to the one side (the upper side in the drawing) in the axial direction by the applied thrust. The elastically-deformable portion 430a of the second preload washer 400a may be, as illustrated in FIG. 12, slightly expanded upward in the axial direction but the inner ring 302 of the second bearing 300b may be pressed in the axial direction by elastic energy accumulated in the elastically-deformable portion 430a. Accordingly, the outer ring 301, the ball 303, and the inner ring 302 of the second bearing 300b can maintain a preset axial clearance despite the application of the thrust by the rotating shaft 210.

The configuration can prevent forced wear of the outer ring 301, the ball 303, and the inner ring 302 of the second bearing 300b, which is caused due to the change (reduction) of the clearance among the outer ring 301, the ball 303, and the inner ring 302 of the second bearing 300b.

Figure 13:
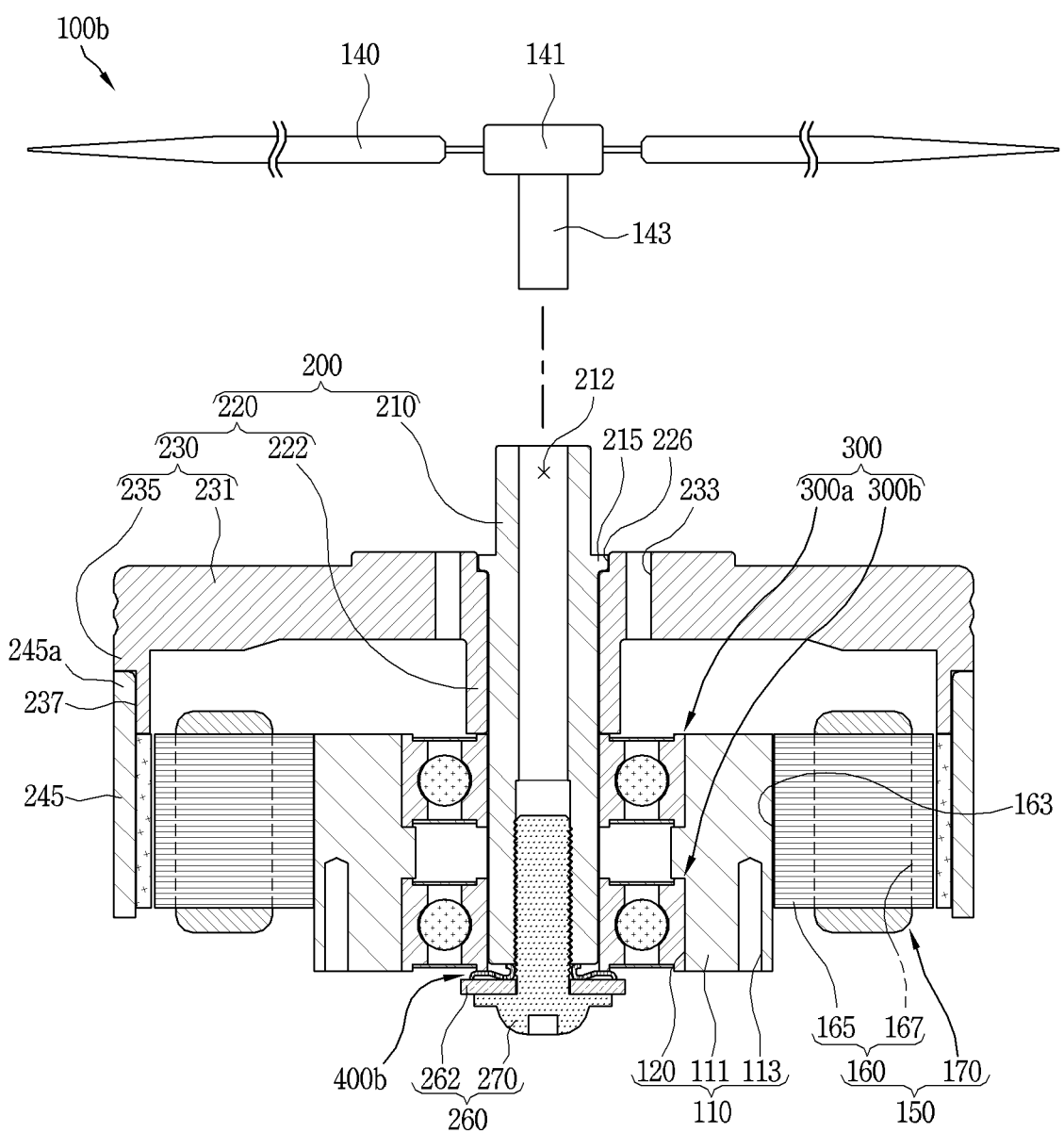
FIG. 13 is a sectional view of an electric motor in accordance with still another implementation of the present disclosure.
Figure 14:
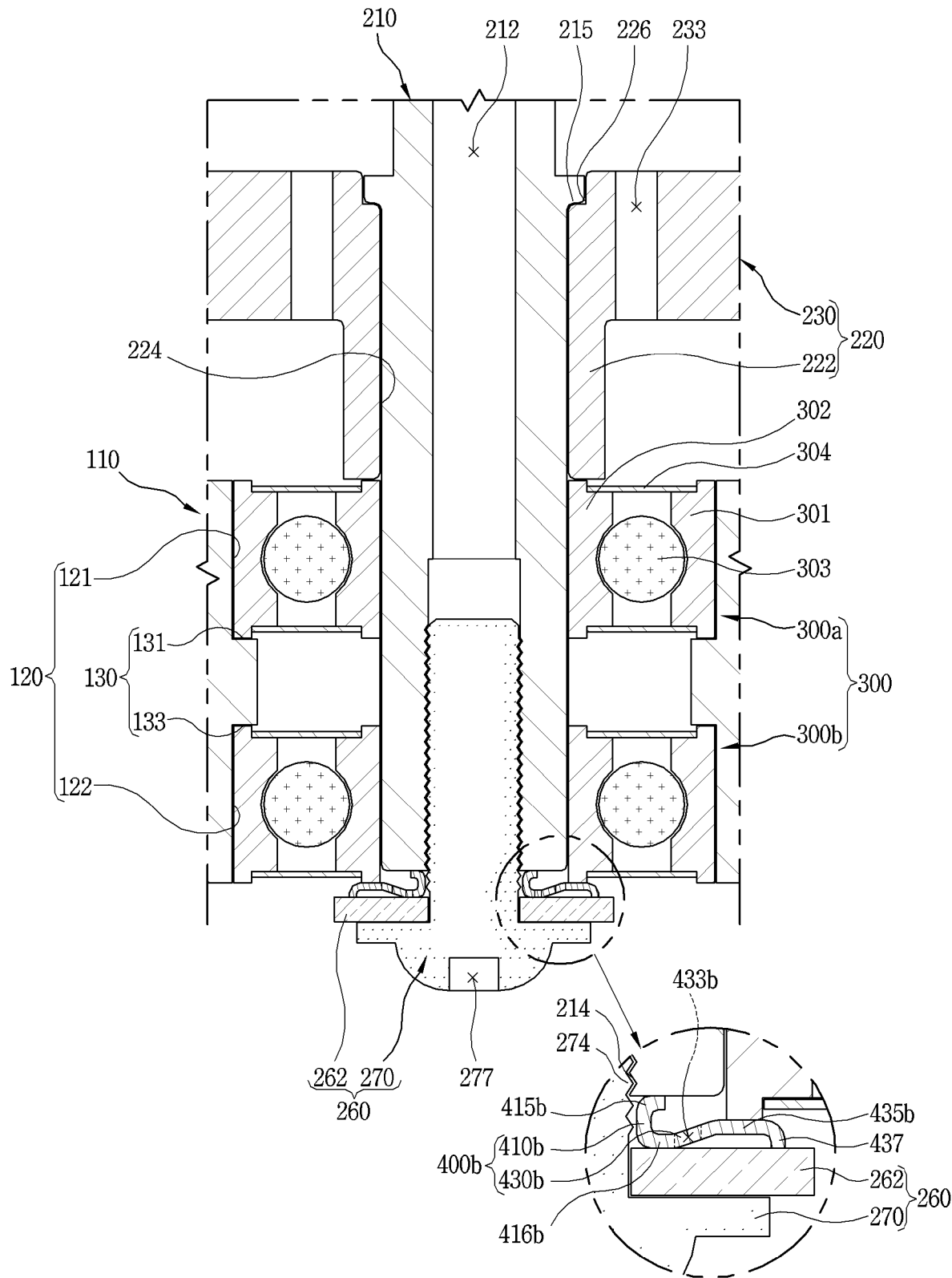
FIG. 14 is an enlarged view of a third preload washer region of FIG. 13.

FIG. 13 is a sectional view of an electric motor in accordance with still another implementation of the present disclosure, and FIG. 14 is an enlarged view of a third preload washer region of FIG. 13. As illustrated in FIGS. 13 and 14, an electric motor 100b according to still another implementation may include a stator 150, a rotor 200, a rotating shaft 210, a bearing 300, and a third preload washer 400b.

The stator 150 may include the stator core 160 and the stator coil 170 wound around the stator core 160. A base member 110 may be disposed at an inner side of the stator 150. A first bearing 300a and a second bearing 300b may be accommodated in the base member 100 to be spaced apart from each other in the axial direction.

The first bearing 300*a* and the second bearing 300*b* each may include an outer ring 301, an inner ring 302 concentrically disposed at an inner side of the outer ring 301, and a plurality of balls 303 disposed between the outer ring 301 and the inner ring 302.

The base member 110 may include a bearing accommodating portion 120 for accommodating the bearing. The base member 110 may include a first bearing outer ring supporting portion 131 for supporting the outer ring 301 of the first bearing 300*a* in the axial direction. The base member 110 may include a second bearing outer ring supporting portion 133 for supporting the outer ring 301 of the second bearing 300*b* in the axial direction.

The rotor 200 may include, for example, a rotating shaft 210, a rotor frame 220 coupled to the rotating shaft 210, and permanent magnets 240 coupled to the rotor frame 220. The rotor frame 220 may include a rotating shaft coupling portion 222 into which the rotating shaft 210 is coupled. A rotating shaft accommodating hole 224 may be formed through the rotating shaft coupling portion 222 in the axial direction such that the rotating shaft 210 can be accommodated.

The rotating shaft 210 and the rotor frame 220 may be coupled to each other to be locked in the axial direction. The rotating shaft coupling portion 222 may be brought into contact with the inner ring 302 of the first bearing 300*a* in the axial direction. The rotating shaft 210 may be provided with a protrusion 215 protruding in the radial direction. The rotor frame 220 may include an accommodating portion 226. The protrusion 215 may be accommodated and locked in the accommodating portion 226 in the axial direction.

The rotating shaft 210 may have a length long enough to protrude to both sides of the rotor frame 220. A plurality of rotating blades 140 may be provided at one end portion (an upper end portion in the drawing) of the rotating shaft 210. The plurality of rotating blades 140 may generate lift during rotation, for example. Thrust may be applied to the rotating shaft 210 toward one side (an upper side in the drawing) in the axial direction when the plurality of rotating blades 140 rotates.

A coupling member 260 may be provided in another end portion (a lower end portion in the drawing) of the rotating shaft 210. The coupling member 260 may include, for example, a washer 262 and a screw 270 screwed into the rotating shaft 210. A female thread portion 214 may be formed in the rotating shaft 210 so that the screw 270 can be screwed.

Meanwhile, a third preload washer 400*b* may be provided between the coupling member 260 and the inner ring 302 of the second bearing 300*b* in the axial direction.

The third preload washer 400*b* may include, for example, a shaft section 410*b* with the fixed length in the axial direction, and one end portion in contact with the coupling member 260 and another end portion contactable with an end portion of the rotating shaft 210, and an elastically-deformable portion 430*b* extending from the shaft section 410*b* in the radial direction and the axial direction to have a free length so as to be brought into contact with the inner ring 302 of the second bearing 300*b*.

Figure 15:
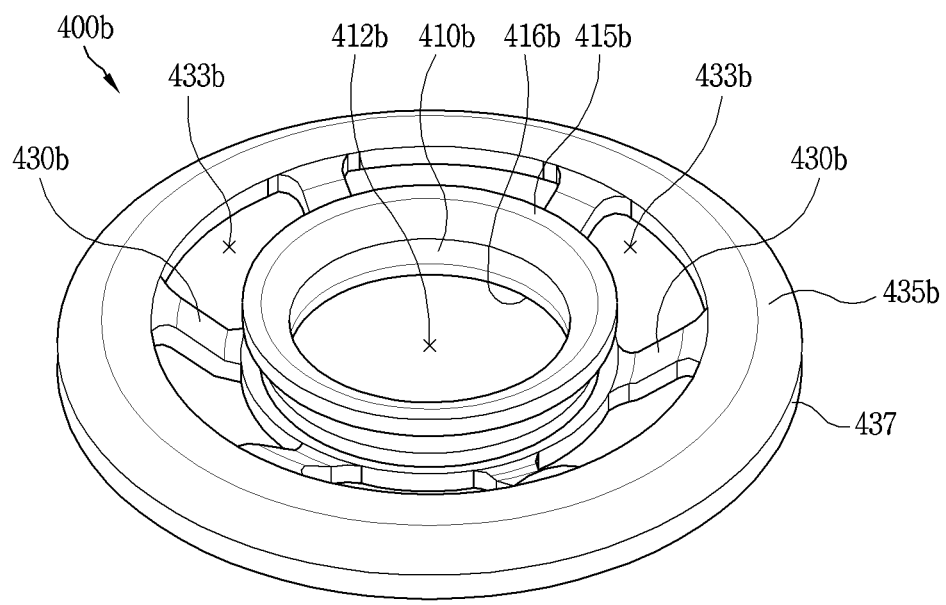
FIG. 15 is a perspective view of the third preload washer of FIG. 13.
Figure 16:
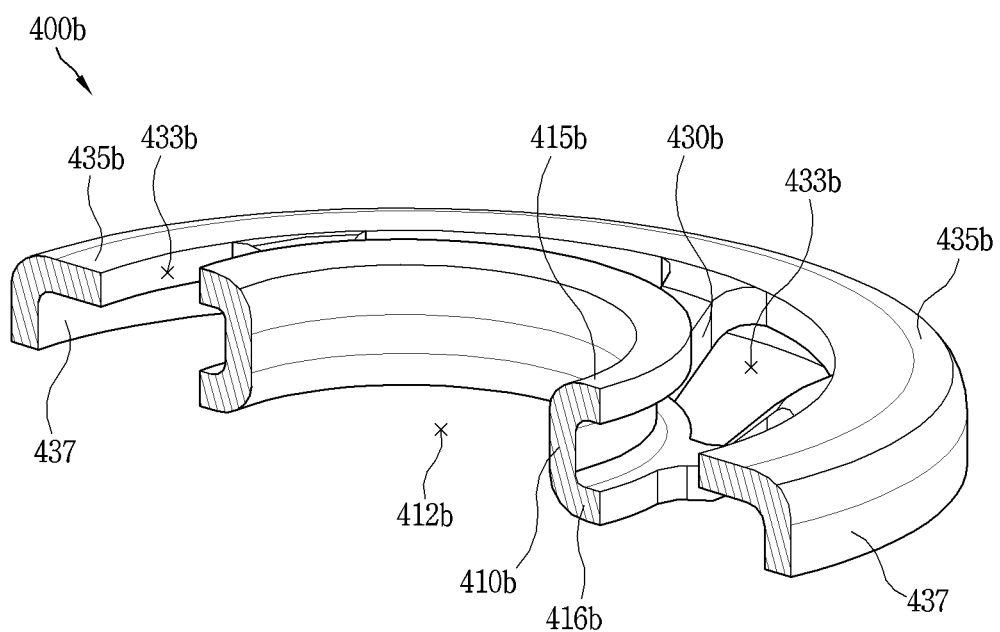
FIG. 16 is a partially-cut sectional view of the third preload washer of FIG. 15.
Figure 17:
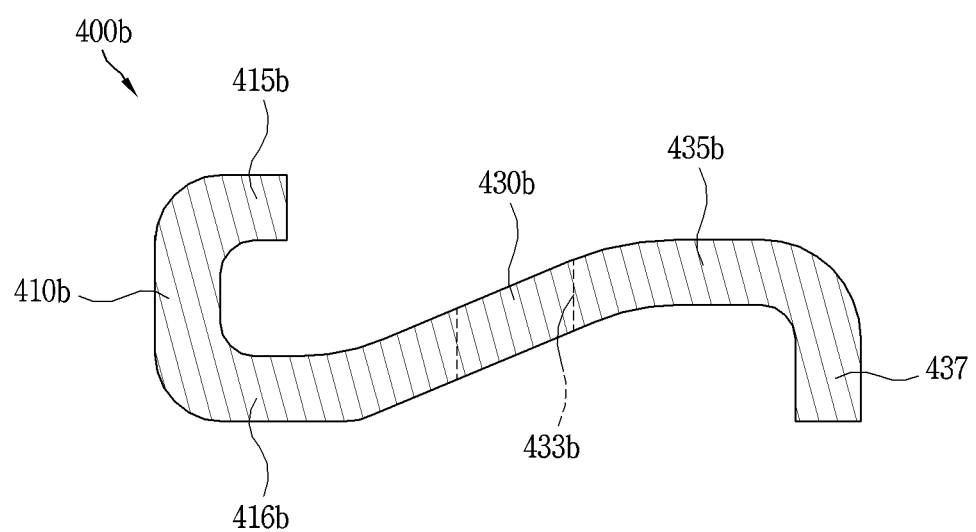
FIG. 17 is an enlarged sectional view of the third preload washer of FIG. 16.
Figure 18:
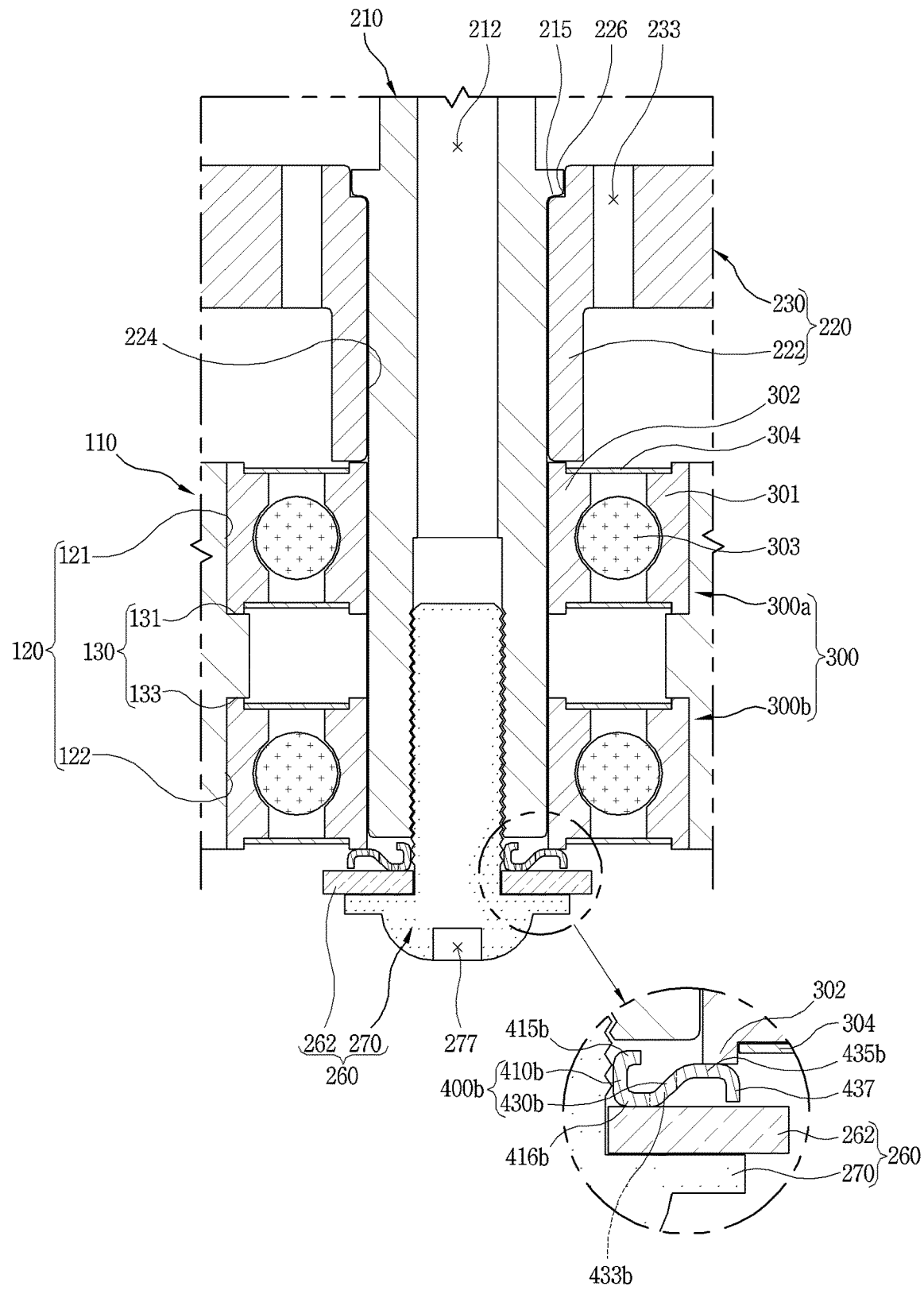
FIG. 18 is a view illustrating a free length at the beginning of coupling the third preload washer of FIG. 16.
Figure 19:
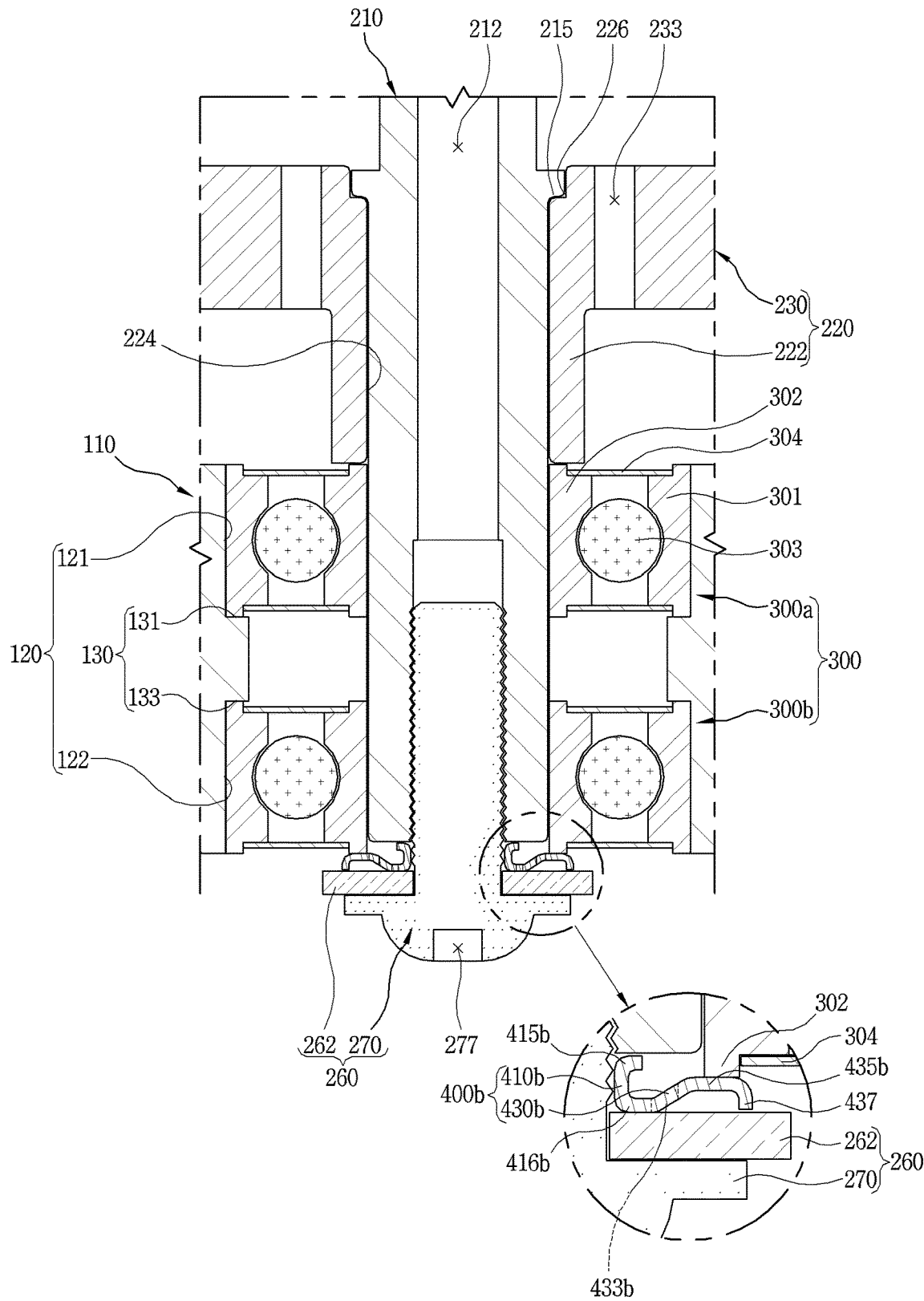
FIG. 19 is a view illustrating a state when thrust of the third preload washer of FIG. 16 is applied.

FIG. 15 is a perspective view of the third preload washer of FIG. 13, FIG. 16 is a partially-cut sectional view of the third preload washer of FIG. 15, FIG. 17 is an enlarged sectional view of the third preload washer of FIG. 16, FIG. 18 is a view illustrating a free length at the beginning of coupling the third preload washer of FIG. 16, and FIG. 19 is a view illustrating a state when thrust of the third preload washer of FIG. 16 is applied. As illustrated in FIG. 15, a rotating shaft hole 412*b* may be provided inside the shaft section 410*b* of the third preload washer 400*b* so that the rotating shaft 210 can be accommodated.

Contact portions 415*b* and 416*b* may radially protrude from both end portions of the shaft section 410*b*, which are spaced apart from each other in the axial direction, and extend in the circumferential direction.

In the implementation, the contact portion 415*b* provided on one end portion (an upper end portion in the drawing) of the shaft section 410*b* may be referred to as a stopper 415*b* in that it is brought into contact with the rotating shaft 220 when the screw 270 is coupled and limits the coupling of the screw 270.

Referring to FIGS. 14 and 16 together, the contact portion 416*b* provided on another end portion end (a lower end portion in the drawing) of the shaft section 410*b* may be referred to as a coupling member contact portion 416*b* in that it comes in contact with the coupling member 260 (the washer 262).

In the implementation, the stopper 415*b* may be brought into contact with the end portion of the rotating shaft 210 after the coupling member 260 is coupled, namely, the elastically-deformable portion 430*b* is elastically deformed.

Meanwhile, in the implementation, the elastically-deformable portion 430*b* of the third preload washer 400*b* may extend, as illustrated in FIG. 17, from the lower contact portion 416*b* (the coupling member contact portion) of the shaft section 410*b* in the radial direction and the axial direction.

Here, the free length Lf of the elastically-deformable portion 430*b* may be smaller than the fixed length L1.

According to the configuration, since the free length Lf of the elastically-deformable portion 430*b* overlaps the fixed length L1 in the axial direction, the total length Lt of the third preload washer 400*b* in the axial direction may be the same as the fixed length L1.

The elastically-deformable portion 430*b* of the third preload washer 400*b* may be provided in plurality, spaced apart from one another in the circumferential direction.

The third preload washer 400*b* may include an annular portion 435*b* having a ring shape to connect end portions of the plurality of elastically-deformable portions 430*b*.

The third preload washer 400*b* may include a skirt portion 437 extending downward from the annular portion 435*b* in the axial direction.

Here, the annular portion 435*b* may be referred to as an inner ring contact portion 435*b* in that it comes in contact with the inner ring 302 of the second bearing 300*b*.

In the implementation, the second bearing 300*b* may protrude from an end portion (a lower end portion in the drawing) of the rotating shaft 210 in the axial direction (see FIG. 14).

The lower end portion of the rotating shaft 210 may be spaced apart from the lower end portion of the inner ring 302 of the second bearing 300*b* by a preset distance upward.

When the coupling member 260 is coupled, both end portions (the stopper 415*b* and the coupling member contact portion 416*b*) of the third preload washer 400*b* may first be brought into contact with the coupling member 260 and the inner ring 302 of the second bearing 300*b* before the third preload washer 400*b* and the end portion of the rotating shaft 210 are brought into contact with each other. Therefore, the elastically-deformable portion 430*b* of the third preload washer 400b may be elastically deformed so as to apply a preset intensity of preload to the inner ring 302 of the second bearing 300b.

With the configuration, the stator 150 may be coupled to the outside of the base member 110, and the rotor frame 220 may be coupled to the rotating shaft 210.

The first bearing 300a and the second bearing 300b may be accommodated in the base member 110, respectively, and the end portion (the lower end portion) of the rotating shaft 210 inserted through the rotor frame 220 may be coupled to the first bearing 300a and the second bearing 300b, respectively.

The third preload washer 400b may be coupled to the end portion (the lower end portion in the drawing) of the rotating shaft 210 which is inserted through the inner ring 302 of the second bearing 300b.

In the state that the elastically-deformable portion 430b of the third preload washer 400b is disposed to face upward, the end portion of the rotating shaft 210 may be inserted into the shaft section 410b.

When the coupling of the third preload washer 400b is completed, the washer 262 may be coupled to the end portion of the rotating shaft 210, and the screw 270 may pass through the washer 262 to be screwed into the female thread portion 214 of the rotating shaft 210.

At this time, when the coupling member 260 is rotated in a direction in which the rotor frame 220 and the coupling member 260 approach each other, the screw 270 may be moved in the axial direction while being inserted into the rotating shaft 210.

When the screw 270 is continuously rotated in the same direction, as illustrated in FIG. 18, an end portion (an upper end portion in the drawing) of the elastically-deformable portion 430b of the third preload washer 400b may be brought into contact with the inner ring 302 of the second bearing 300b.

When the screw 270 is continuously rotated, the elastically-deformable portion 430b may be compressed in the axial direction to accumulate elastic energy. The elastically-deformable portion 430b may then press the inner ring 302 of the second bearing 300b in the axial direction, thereby applying a preset intensity of preload to the inner ring 302 of the second bearing 300b.

When the screw 270 is continuously rotated, the end portion (the stopper 415b) of the shaft section 410b may be brought into contact with the end portion of the rotating shaft 210, and accordingly rotational reaction force of the screw 270 may be significantly increased. Therefore, the coupling of the screw 270 can be terminated.

On the other hand, when the operation is started and the rotor 200 is rotated, the thrust generated by the rotation of the plurality of rotating blades 140 may be applied to the rotating shaft 210 toward one side (a left side in the drawing) along the axial direction.

Accordingly, as illustrated in FIG. 19, the preload washer 400b may be expanded upward by a minute displacement $\Delta L$ in the axial direction to correspond to the displacement caused by the thrust. At this time, since the displacement in the axial direction due to the application of the thrust is remarkably small compared to a total displacement of the elastically-deformable portion 400b in the axial direction, the preload washer 400b can still be maintained in the elastically-deformed state. Accordingly, the preload washer 400b can press the inner ring 302 of the second bearing 300b with the accumulated elastic energy, so as to continuously apply the preset intensity of preload.

With the configuration, the outer ring 301, the ball 303, and the inner ring 302 of the second bearing 300b can stably maintain a clearance set to be suitable for rotation. This may result in suppressing forced wear of the outer ring 301, the ball 303, and the inner ring 302 of the second bearing 300b from being caused due to the reduction of the clearance.

Accordingly, the useful life of the second bearing 300b of the electric motor 100b according to the implementation can be remarkably extended.

Figure 20:
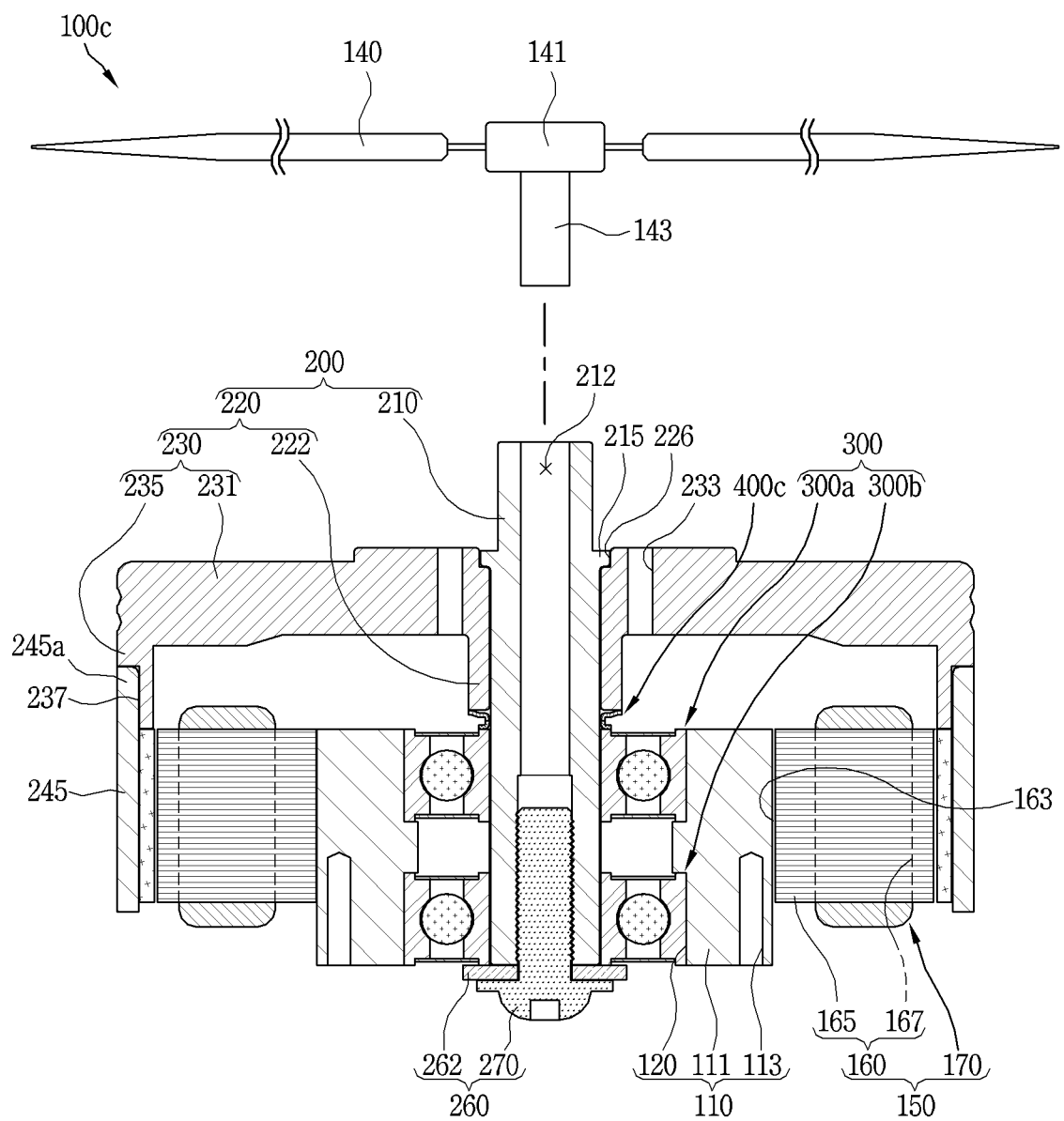
FIG. 20 is a sectional view of an electric motor in accordance with still another implementation of the present disclosure.
Figure 21:
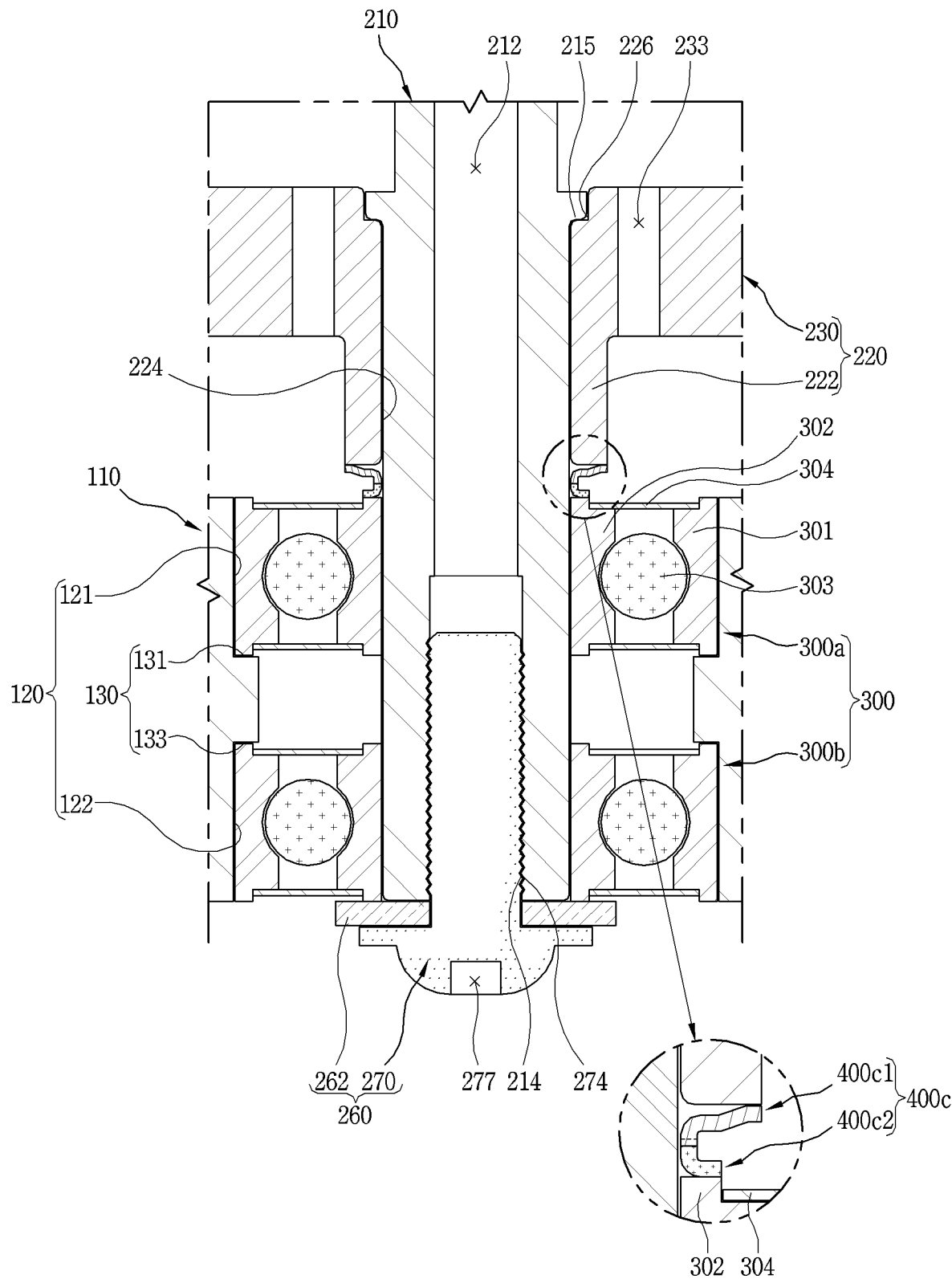
FIG. 21 is an enlarged view of a preload washer region of FIG. 20.
Figure 22:
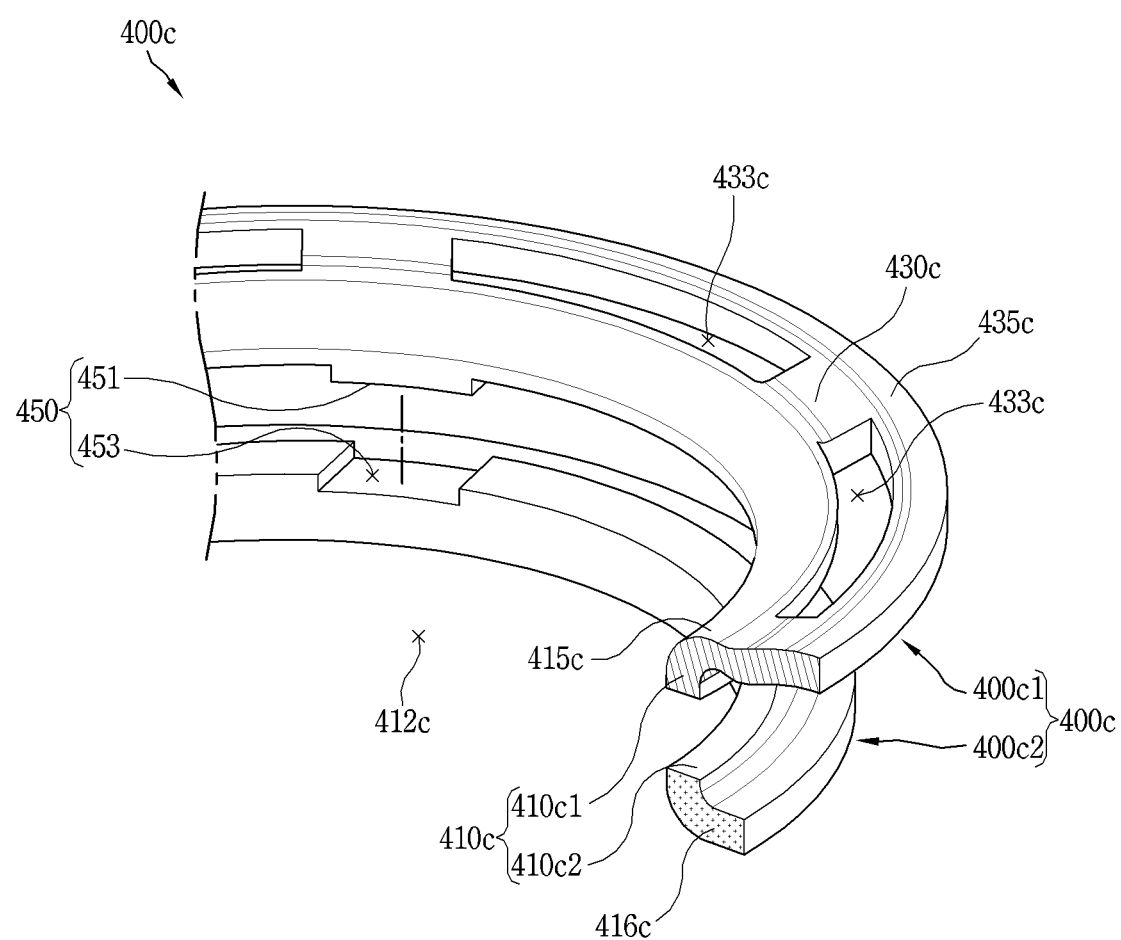
FIG. 22 is a partial sectional view illustrating a state before coupling a first partial preload washer and a second partial preload washer of FIG. 21.
Figure 23:
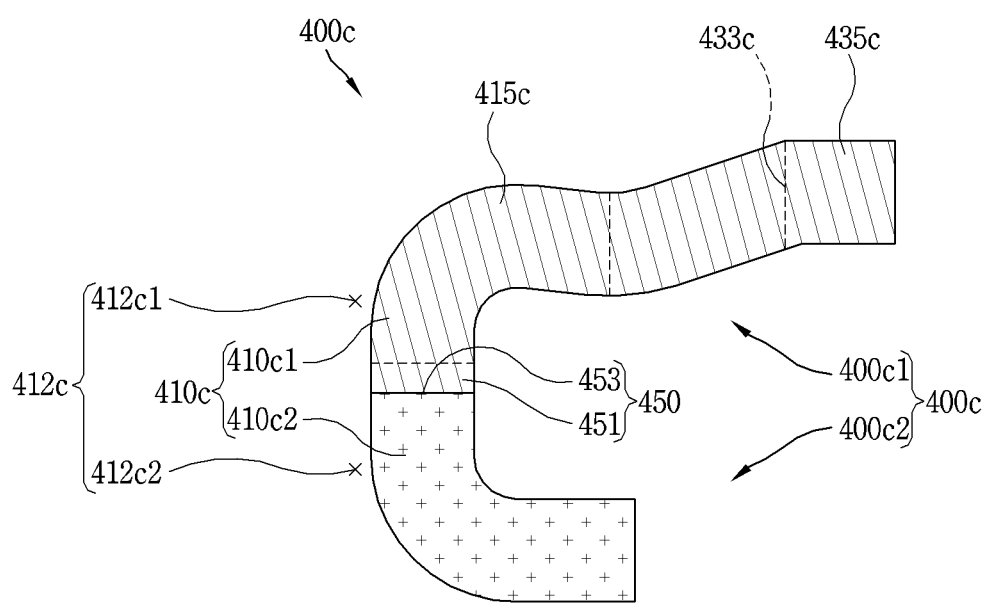
FIG. 23 is an enlarged sectional view illustrating a coupled state of the first partial preload washer and the second partial preload washer of FIG. 22.

FIG. 20 is a sectional view of an electric motor in accordance with another implementation of the present disclosure, FIG. 21 is an enlarged view of preload washer region of FIG. 20, FIG. 22 is a partial sectional view illustrating a state before coupling a first partial preload washer and a second partial preload washer of FIG. 21, and FIG. 23 is an enlarged sectional view illustrating a coupled state of the first partial preload washer and the second partial preload washer of FIG. 22. As illustrated in FIGS. 20 and 21, an electric motor 100c according to an implementation may include a base member 110, a rotor 200, a rotating shaft 210, a bearing 300, and a preload washer 400c.

The stator 150 may include the stator core 160 and the stator coil 170 wound around the stator core 160.

A base member 110 may be disposed at an inner side of the stator 150.

A first bearing 300a and a second bearing 300b may be accommodated in the base member 100 to be spaced apart from each other in the axial direction.

The first bearing 300a may include an outer ring 301, an inner ring 302 concentrically disposed at an inner side of the outer ring 301, and a plurality of balls 303 disposed between the outer ring 301 and the inner ring 302.

The second bearing 300b may include an outer ring 301, an inner ring 302 concentrically disposed at an inner side of the outer ring 301, and a plurality of balls 303 disposed between the outer ring 301 and the inner ring 302.

The base member 110 may include a bearing accommodating portion 120 for accommodating the bearing 300.

The base member 110 may include a first bearing outer ring supporting portion 131 for supporting the outer ring 301 of the first bearing 300a in the axial direction.

The base member 110 may include a second bearing outer ring supporting portion 133 for supporting the outer ring 301 of the second bearing 300b in the axial direction.

The rotor 200 may include, for example, a rotating shaft 210, a rotor frame 220 coupled to the rotating shaft 210, and permanent magnets 240 coupled to the rotor frame 220.

The rotor frame 220 may include a rotating shaft coupling portion into which the rotating shaft 210 is coupled.

A rotating shaft accommodating hole 224 may be formed through the rotating shaft coupling portion 222 in the axial direction such that the rotating shaft 210 can be accommodated.

The rotating shaft 210 and the rotor frame 220 may be coupled to each other to be locked in the axial direction.

The rotating shaft 210 may be provided with a protrusion 215 protruding in the radial direction.

The rotor frame 220 may include an accommodating portion 226. The protrusion 215 may be accommodated and locked in the accommodating portion 226 in the axial direction.

The rotating shaft 210 may have a length long enough to protrude to both sides of the rotor frame 220.

A plurality of rotating blades 140 may be provided at one end portion (an upper end portion in the drawing) of the rotating shaft 210.

The plurality of rotating blades 140 may generate lift during rotation, for example.

Thrust may be applied to the rotating shaft 210 toward one side (an upper side in the drawing) in the axial direction when the plurality of rotating blades 140 rotates.

A coupling member 260 may be provided in another end portion (a lower end portion in the drawing) of the rotating shaft 210.

The coupling member 260 may include, for example, a washer 262 and a screw 270 screwed into the rotating shaft 210.

A female thread portion 214 may be formed in the rotating shaft 210 so that the screw 270 can be screwed.

Meanwhile, a preload washer 400c may be provided between the coupling member 260 and the inner ring 302 of the second bearing 300b in the axial direction.

The preload washer 400c may include, for example, a first partial preload washer 400c1 and a second partial preload washer 400c2 coupled to each other in the axial direction.

As illustrated in FIGS. 22 and 23, for example, the first partial preload washer 400c1 may define a part of the fixed length in the axial direction, and include a first partial shaft section 410c1 coupled to the rotating shaft 210, and an elastically-deformable portion 430c extending from the first partial shaft section 410c1 in the radial direction and the axial direction to have a free length so as to be elastically deformable in the axial direction.

The second partial preload washer 400c2 may include a second partial shaft section 410c2 coupled to the rotating shaft 210 to define the fixed length cooperatively with the first partial shaft section 410c1 in the axial direction, and a contact portion 416c protruding from the second partial shaft section 410c2 in the radial direction and extending in the circumferential direction.

The contact portion 416c of the second partial preload washer 400c2 may be referred to as an inner ring contact portion 416c in that it comes in contact with the inner ring 302 of the first bearing 300a.

A contact portion 415c may protrude in the radial direction from one end portion (an upper end portion in the drawing) of the first partial shaft section 410c1 of the first partial preload washer 400c1 and extend in the circumferential direction.

Here, the contact portion 415c may be referred to as a stopper 415c in that it comes in contact with the rotor frame 220 (the rotating shaft coupling portion 222) when the coupling member 260 is coupled so as to limit the coupling of the coupling member 260.

The first partial preload washer 400c1 may include a plurality of elastically-deformable portions 430c spaced apart from one another in the circumferential direction.

Slots 433c may be formed in a penetrating manner between two adjacent elastically-deformable portions 430c of the plurality of elastically-deformable portions 430c.

The first partial preload washer 400c1 may include an annular portion 435c having a ring shape to connect outer end portions of the plurality of elastically-deformable portions 430c. The annular portion 435 may be referred to as a rotor frame contact portion 435c in that it comes in contact with the rotor frame 220.

Here, the elastically-deformable portion 430c of the first partial preload washer 400c1 may be configured to increase an overall length of the preload washer 400c in the axial direction.

The first partial shaft section 410c1 and the second partial shaft section 410c2 of the preload washer 400c may be provided with rotating shaft holes 412c1 and 412c2, respectively, for accommodating the rotating shaft 210.

On the other hand, an engagement part 450 may be disposed between the first partial shaft section 410c1 and the second partial shaft section 410c2 such that the first partial shaft section 410c1 and the second partial shaft section 410c2 are engaged with each other to be overlapped in the axial direction and locked in the circumferential direction.

The engagement part 450 may be provided with a protrusion 451 protruding from one of contact surfaces of the first partial preload washer 210c1 and the second partial shaft section 410c2 in the axial direction, and a protrusion accommodating portion 453 formed in another contact surface to accommodate the protrusion 451.

The implementation illustrates that the protrusion 451 protrudes from the first partial shaft section 410c1 and the protrusion accommodating portion 453 is formed in the second partial shaft section 410c2. However, this is merely illustrative and the present disclosure may not be limited to this.

More specifically, for example, the protrusion 451 may protrude from an end portion of the first partial shaft section 410c1 in the axial direction and the protrusion accommodating portion 453 may be recessed into an end portion of the second partial shaft section 410c2 in the axial direction.

Here, the first partial preload washer 400c1 and the second partial preload washer 400c2 may be formed of different materials.

In detail, the first partial preload washer 400c1 having the elastically-deformable portion 430c may be formed of a material having a larger elastic modulus than the second partial preload washer 400c2.

For example, the first partial preload washer 400c1 may be made of spring steel, and the second partial preload washer 400c2 may be made of a material (e.g., general steel) having a smaller elastic modulus than the spring steel.

This may result in reducing a usage amount of the material having the relatively large elastic modulus.

Therefore, as compared to manufacturing the whole preload washer 400c using a material (spring steel) having a large elastic modulus, the number of processes of manufacturing parts using the material having the large elastic modulus can be reduced, thereby allowing fast and quick manufacturing of the whole preload washer.

In addition, the reduction of the usage of the material made of the material (spring steel) having the large elastic material, which is relatively expensive, can result in decreasing an entire manufacturing cost of the preload washer 400c.

With the configuration, the stator 150 may be coupled to the outside of the base member 110, and the first bearing 300a and the second bearing 300b may be coupled to be disposed in the base member 110.

The rotor frame 220 may be coupled to the rotating shaft 210, and the first partial preload washer 400c1 and the second partial preload washer 400c2 may be coupled in the axial direction, respectively. At this time, the first partial preload washer 400c1 and the second partial preload washer 400c2 may be engaged with each other in the axial direction.

When the coupling of the first partial preload washer 400c1 and the second partial preload washer 400c2 is completed, the rotating shaft 210 may be coupled to the inner ring 302 of the first bearing 300a and the inner ring 302 of the second bearing 300b.

The washer 262 and the screw 270 may be coupled to the end portion of the rotating shaft 210 inserted through the inner ring 302 of the second bearing 300b.

When the screw 270 is rotated in a direction of reducing a distance between the rotor frame 220 and the coupling member (the screw 270), the washer 262 may be brought into contact with the inner ring 302 of the second bearing 300b and the rotor frame 220 may be relatively moved in the axial direction.

As a result, the elastically-deformable portion 430c of the preload washer 400c may be compressed in the axial direction to accumulate elastic energy.

When the screw 270 is continuously rotated, the elastically-deformable portion 430c may be elastically deformed to be disposed almost horizontally, and the upper contact portion 415c (the stopper 415c) of the first partial shaft section 410c1 may be brought into contact with the rotor frame 220. Accordingly, when reaction force with respect to the rotation of the screw 270 is significantly increased, the coupling of the screw 270 may be terminated.

On the other hand, when the operation is started and lift is generated by the rotation of the plurality of rotating blades 140, thrust may be applied to the rotating shaft 210 upward in the drawing along the axial direction.

When the thrust is applied to the rotating shaft 210, the rotor frame 220 may be slightly displaced upward in the drawing, and thereby the elastically-deformable portion 430c of the preload washer 400c may be expanded in the axial direction by that much. The preload washer 400c may still be maintained in the elastically-deformed state even though the displacement slightly occurs in its expanded direction due to the thrust, a preset intensity of preload can continuously be applied to the inner ring 302 of the first bearing 300a.

Accordingly, the outer ring 301, the ball 303, and the inner ring 302 of the first bearing 300a may stably maintain their initial clearance without a reduction of a preset clearance, thereby suppressing forced wear of the outer ring 301, the ball 303, and the inner ring 302 due to the reduction of the clearance.

Therefore, the useful life of the bearing 300a can be elongated.

Figure 24:
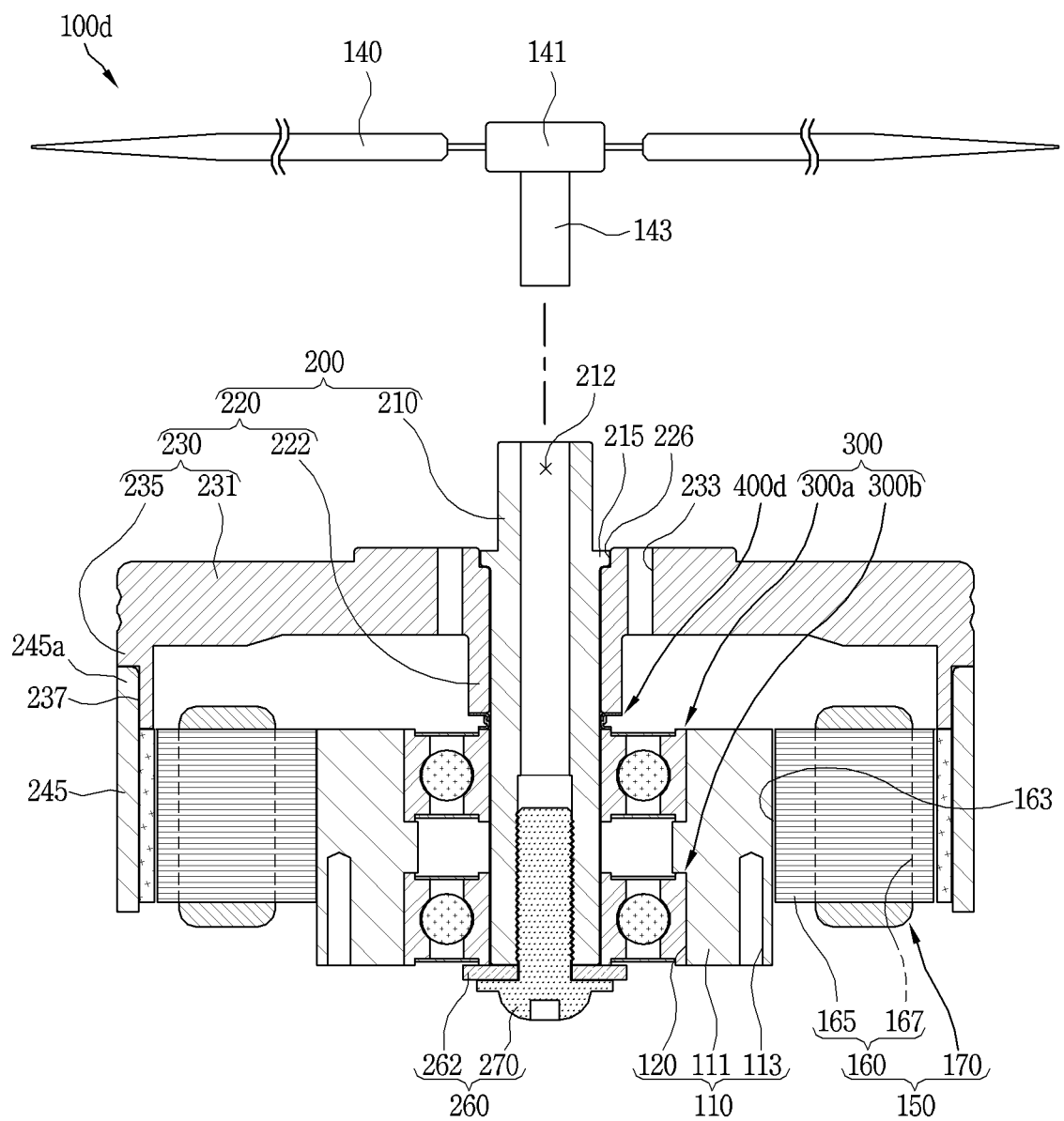
FIG. 24 is a sectional view of an electric motor in accordance with still another implementation of the present disclosure.
Figure 25:
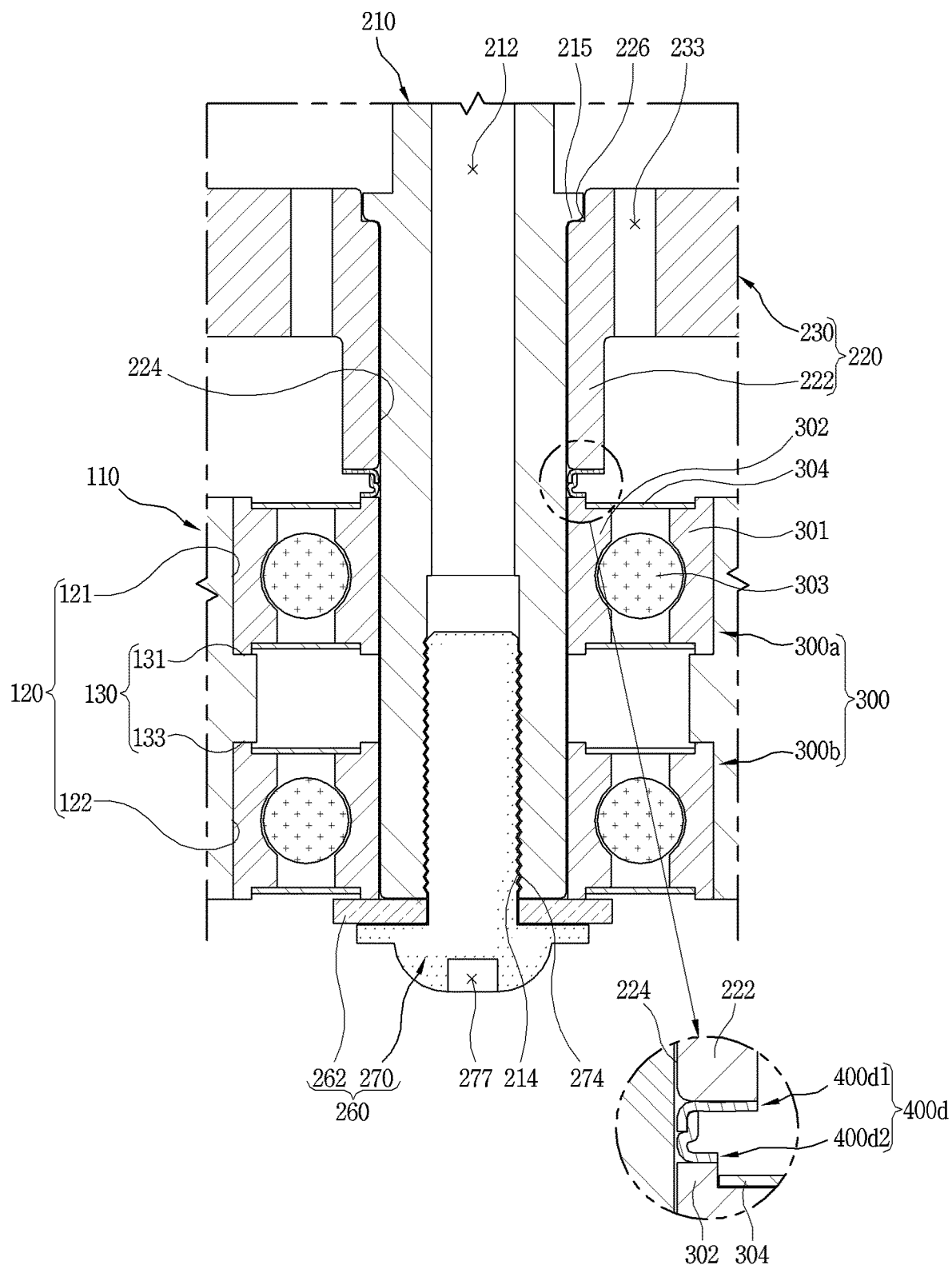
FIG. 25 is an enlarged view of a preload washer region of FIG. 24.

FIG. 24 is a sectional view of an electric motor in accordance with still another implementation of the present disclosure, and FIG. 25 is an enlarged view of a preload washer region of FIG. 24. As illustrated in FIGS. 24 and 25, an electric motor 100d according to still another implementation may include a stator 150, a rotor 200, a rotating shaft 210, a bearing 300, and a preload washer 400d.

The stator 150 may include the stator core 160 and the stator coil 170 wound around the stator core 160.

A base member 110 may be disposed at an inner side of the stator 150.

A first bearing 300a and a second bearing 300b may be accommodated in the base member 100 to be spaced apart from each other in the axial direction.

The first bearing 300a may include an outer ring 301, an inner ring 302 concentrically disposed at an inner side of the outer ring 301, and a plurality of balls 303 disposed between the outer ring 301 and the inner ring 302.

The second bearing 300b may include an outer ring 301, an inner ring 302 concentrically disposed at an inner side of the outer ring 301, and a plurality of balls 303 disposed between the outer ring 301 and the inner ring 302.

The base member 110 may include a bearing accommodating portion 120 for accommodating the bearing.

The base member 110 may include a first bearing outer ring supporting portion 131 for supporting the outer ring 301 of the first bearing 300a in the axial direction.

The base member 110 may include a second bearing outer ring supporting portion 133 for supporting the outer ring 301 of the second bearing 300b in the axial direction.

The rotor 200 may include, for example, a rotating shaft 210, a rotor frame 220 coupled to the rotating shaft 210, and permanent magnets 240 coupled to the rotor frame 220.

The rotor frame 220 may include a rotating shaft coupling portion into which the rotating shaft 210 is coupled.

A rotating shaft accommodating hole 224 may be formed through the rotating shaft coupling portion 222 in the axial direction such that the rotating shaft 210 can be accommodated.

On the other hand, the rotating shaft 210 and the rotor frame 220 may be coupled to each other to be locked in the axial direction.

The rotating shaft 210 may be provided with a protrusion 215 protruding in the radial direction.

The rotor frame 220 may include an accommodating portion 226. The protrusion 215 may be accommodated and locked in the accommodating portion 226 in the axial direction.

The rotating shaft 210 may have a length long enough to protrude to both sides of the rotor frame 220.

A plurality of rotating blades 140 may be provided at one end portion (an upper end portion in the drawing) of the rotating shaft 210.

The plurality of rotating blades 140 may generate lift during rotation, for example.

Thrust may be applied to the rotating shaft 210 toward one side (an upper side in the drawing) in the axial direction when the plurality of rotating blades 140 rotates.

A coupling member 260 may be provided in another end portion (a lower end portion in the drawing) of the rotating shaft 210.

The coupling member 260 may include, for example, a washer 210 and a screw 270 screwed into the rotating shaft 210.

A female thread portion 214 may be formed in the rotating shaft 210 so that the screw 270 can be screwed.

Meanwhile, a preload washer 400d may be provided between the coupling member 260 and the inner ring 302 of the second bearing 300b in the axial direction.

The preload washer 400d may include, for example, a first partial preload washer 400d1 and a second partial preload washer 400d2 coupled to each other in the axial direction.

Figure 26:
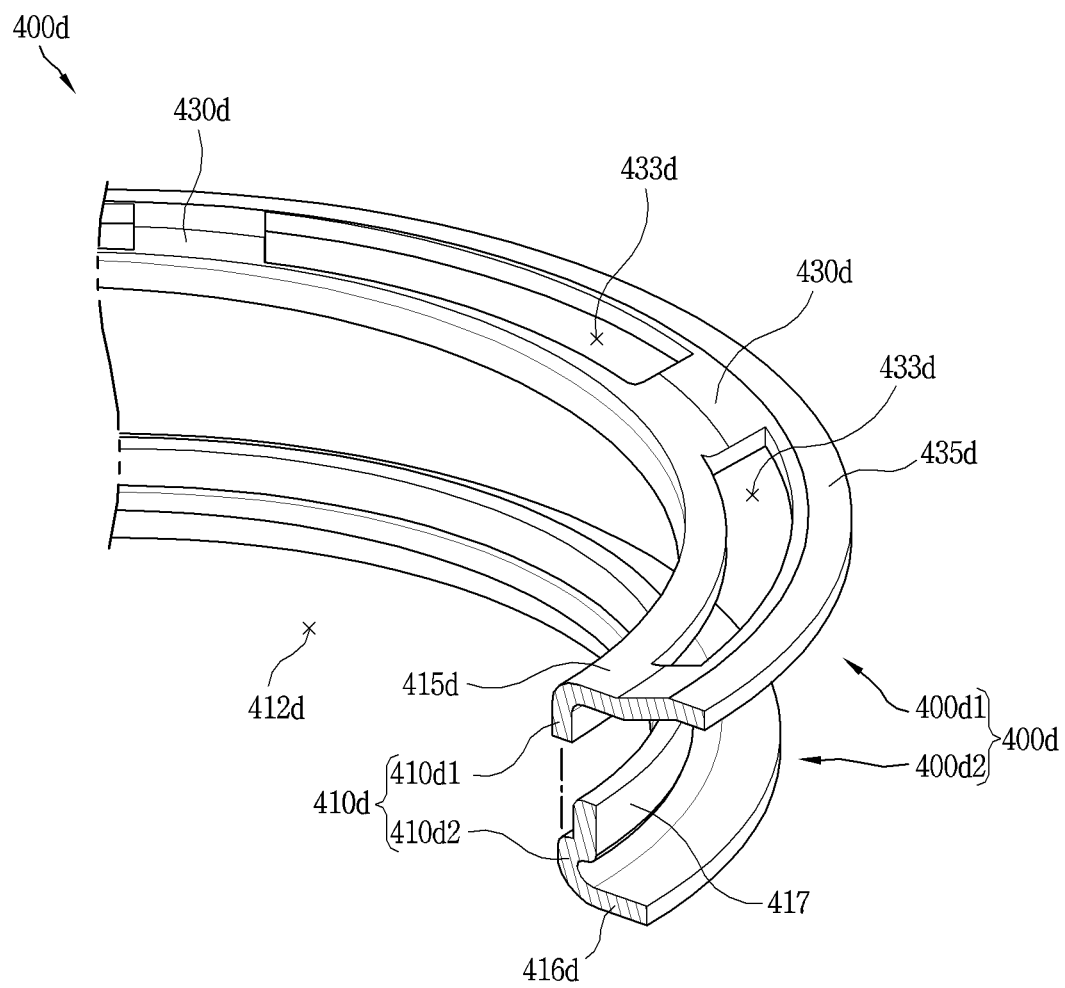
FIG. 26 is a partial sectional view illustrating a state before coupling a first partial preload washer and a second partial preload washer of FIG. 25.
Figure 27:
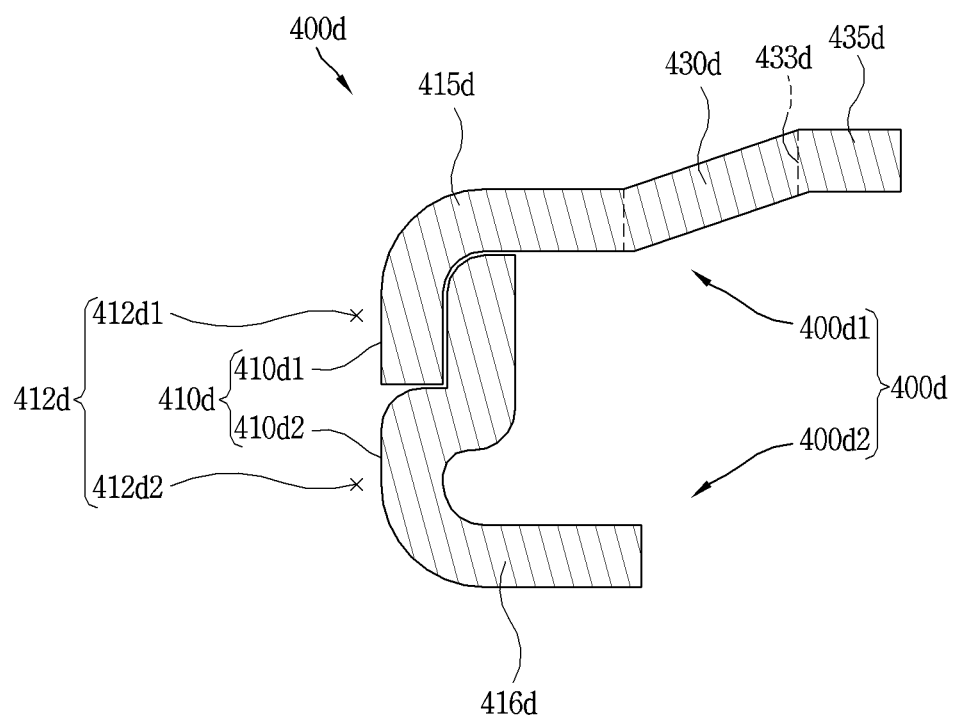
FIG. 27 is an enlarged sectional view illustrating a coupled state of the first partial preload washer and the second partial preload washer of FIG. 26.
Figure 28:
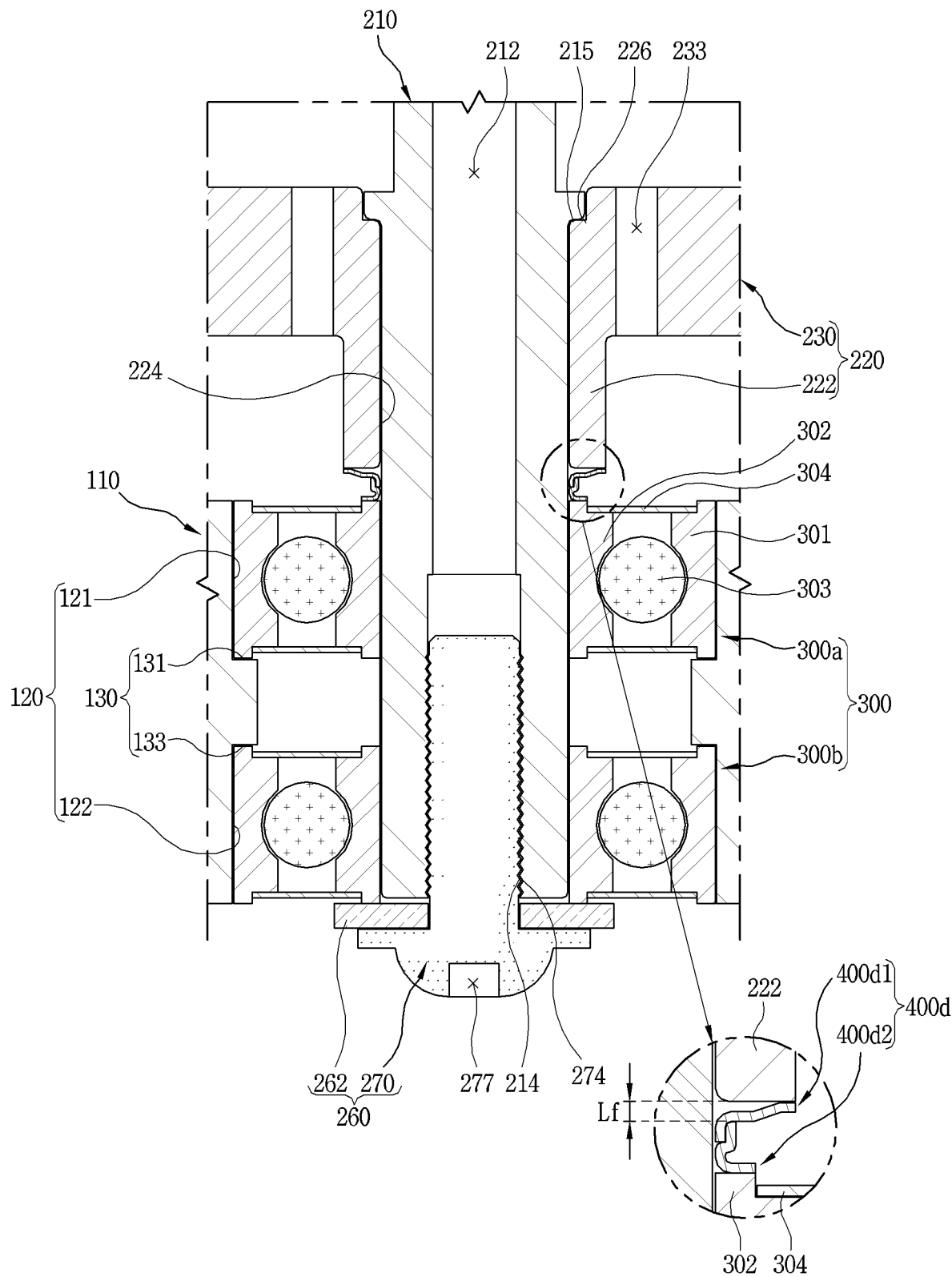
FIG. 28 is a view illustrating a free length at the beginning of coupling the first partial preload washer and the second partial preload washer of FIG. 26.
Figure 29:
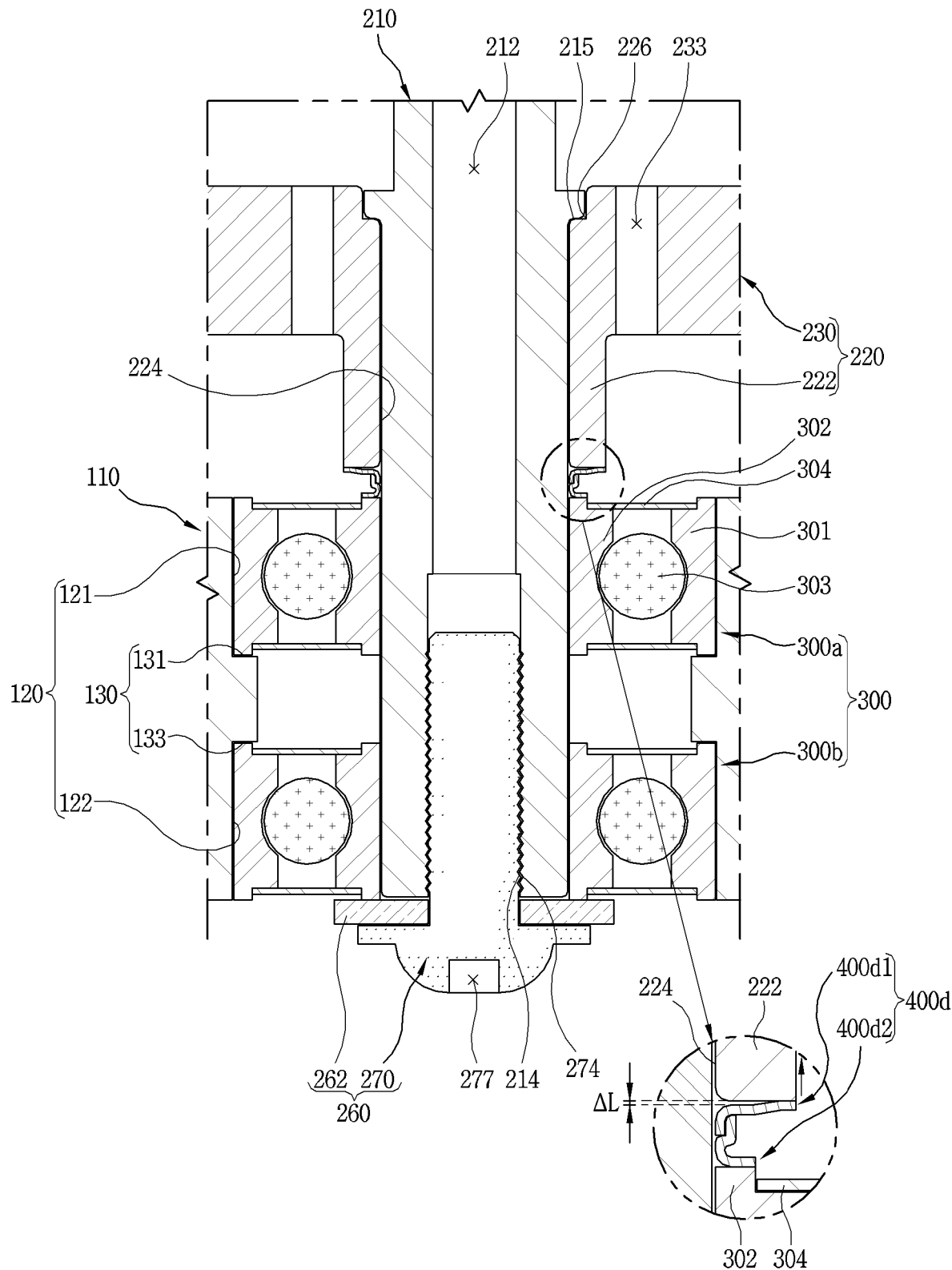
FIG. 29 is a view illustrating a state when thrust is applied to the first partial preload washer and the second partial preload washer of FIG. 26.

FIG. 26 is a partial sectional view illustrating a state before coupling a first partial preload washer and a second partial preload washer of FIG. 25, FIG. 27 is an enlarged sectional view illustrating a coupled state of the first partial preload washer and the second partial preload washer of FIG. 26, FIG. 28 is a view illustrating a free length at the beginning of coupling the first partial preload washer and the second partial preload washer of FIG. 26, and FIG. 29 is a view illustrating a state when thrust is applied to the first partial preload washer and the second partial preload washer of FIG. 26.

As illustrated in FIGS. 26 and 27, the first partial preload washer 400d1 may define a part of the fixed length in the axial direction, and include a first partial shaft section 410d1 coupled to the rotating shaft 210, and an elastically-deformable portion 430d extending from the first partial shaft section 410d1 in the radial direction and the axial direction to have a free length so as to be elastically deformable in the axial direction.

The second partial preload washer 400d2 may include a second partial shaft section 410d2 coupled to the rotating shaft 210 to define the fixed length cooperatively with the first partial shaft section 410*d*1 in the axial direction, and a contact portion 416*d* extending from the second partial shaft section 410*d*2 in the radial direction.

Here, the first partial shaft section 410*d*1 and the second partial shaft section 410*d*2 may be provided with rotating shaft holes 412*d*1 and 412*d*2, respectively, for accommodating the rotating shaft 210.

In the implementation, the contact portion 416*d* of the second partial preload washer 400*d*2 may be referred to as an inner ring contact portion 416*d* in that it comes in contact with the inner ring 302 of the first bearing 300*a*.

A contact portion 415*d* may be provided at one end portion (an upper end portion in the drawing) of the first partial shaft section 410*d*1 of the first partial preload washer 400*d*1. Here, the contact portion 415*d* of the first partial shaft section 410*d*1 may be referred to as a stopper 415*d* in that it comes in contact with the rotor frame 220 (the rotating shaft coupling portion 222) when the coupling member 260 is coupled so as to limit the coupling of the coupling member 260.

The first partial preload washer 400*d*1 may include a plurality of elastically-deformable portions 430*d* spaced apart from one another in the circumferential direction.

The plurality of elastically-deformable portions 430*d* may extend from the upper end portion (the stopper 415*d*) of the first partial shaft section 410*d*1 in the radial direction and the axial direction, respectively.

Slots 433*d* may be formed in a penetrating manner between two adjacent elastically-deformable portions 430*d* of the plurality of elastically-deformable portions 430*d*.

The first partial preload washer 400*d*1 may include an annular portion 435*d*1 having a ring shape to connect outer end portions of the plurality of elastically-deformable portions 430*d*. Here, the annular portion 435*d*1 may be referred to as a rotor frame contact portion 435*d*1 in that it comes in contact with the rotor frame 220 (the rotating shaft coupling portion 222).

Here, the elastically-deformable portion 430*d* of the first partial preload washer 400*d*1 may be configured to increase an overall length of the preload washer in the axial direction.

On the other hand, the second partial preload washer 400*d*2 may include a first partial shaft section accommodating portion 417 that accommodates the first partial shaft section 410*d*1 of the first partial preload washer 400*d*1.

The first partial shaft section accommodating portion 417 may protrude from the second partial shaft section 410*d*2 in the radial direction and then may be bent in the axial direction, for example.

A space in which the first partial shaft section accommodating portion 417 can be inserted may be formed between an inner surface of the first partial shaft section accommodating portion 417 and the outer surface of the rotating shaft 210.

As illustrated in FIG. 27, an end portion (an upper end portion in the drawing) of the first partial shaft section accommodating portion 417 may be brought into contact with the elastically-deformable portion 430*d* in the axial direction.

Accordingly, when the elastically-deformable portion 430*d* is elastically deformed, the elastically-deformable portion 430*d* can be stably supported.

Here, the first partial preload washer 400*d*1 and the second partial preload washer 400*d*2 may be formed of different materials.

In detail, the first partial preload washer 400*d*1 having the elastically-deformable portion 430*d* may be formed of a material having a larger elastic modulus than the second partial preload washer 400*d*2.

For example, the first partial preload washer 400*d*1 may be made of spring steel, and the second partial preload washer 400*d*2 may be made of a material (e.g., general steel) having a smaller elastic modulus than the spring steel.

This may result in reducing a usage amount of the material having the relatively large elastic modulus.

Therefore, as compared to manufacturing the whole preload washer 400*d* using a material (spring steel) having a large elastic modulus, the number of processes of manufacturing parts using the material having the large elastic modulus can be reduced, thereby allowing fast and quick manufacturing of the whole preload washer.

In addition, the reduction of the usage of the spring steel, which is relatively expensive, can result in decreasing an entire manufacturing cost of the preload washer 400*d*.

In addition, the second partial preload washer 400*d*2 can be manufactured relatively easily because a relatively weak pressing force is applied when forming the protrusion 451 and the first partial shaft section accommodating portion 417.

With the configuration, the stator 150 may be coupled to the outside of the base member 110, and the first bearing 300*a* and the second bearing 300*b* may be coupled to be disposed in the base member 110.

The rotor frame 220 may be coupled to the rotating shaft 210 and the first partial preload washer 400*d*1 and the second partial preload washer 400*d*2 may be coupled in the axial direction, respectively. At this time, the first partial preload washer 400*d*1 and the second partial preload washer 400*d*2 may be engaged with each other in the axial direction.

The first partial shaft section 410*d*1 of the first partial preload washer 400*d*1 may be inserted into the first partial shaft section accommodating portion 417 of the second partial preload washer 400*d*2 in the axial direction.

When the coupling of the first partial preload washer 400*d*1 and the second partial preload washer 400*d*2 is completed, the rotating shaft 210 may be coupled to the inner ring 302 of the first bearing 300*a* and the inner ring 302 of the second bearing 300*b*.

The washer 262 and the screw 270 may be coupled to the end portion of the rotating shaft 210 inserted through the inner ring 302 of the second bearing 300*b*.

When the screw 270 is rotated in a direction of reducing a distance between the rotor frame 220 and the screw 270, the washer 262 may be brought into contact with the inner ring 302 of the second bearing 300*b* and the rotor frame 220 may be relatively moved in the axial direction.

As a result, the elastically-deformable portion 430*d* of the preload washer 400*d* may be compressed in the axial direction to accumulate elastic energy.

When the screw 270 is continuously rotated, the elastically-deformable portion 430*d* may be elastically deformed to be arranged almost horizontally and the end portion of the first partial shaft section 410*d*1 may be brought into contact with the rotor frame 220, so that the rotational reaction force of the screw 270 can be significantly increased. Therefore, the coupling of the screw 270 can be easily terminated.

On the other hand, when the operation is started and lift is generated by the rotation of the plurality of rotating blades 140, thrust may be applied to the rotating shaft 210 upward in the drawing along the axial direction.

When the thrust is applied to the rotating shaft 210, the rotor frame 220 may be slightly displaced upward in the drawing, and accordingly the elastically-deformable portion 430*d* of the preload washer 400*d* may be expanded in the axial direction. The preload washer 400d may still be maintained in the elastically-deformed state even though the displacement slightly occurs in its expanded direction due to the thrust, a preset intensity of preload can continuously be applied to the inner ring 302 of the first bearing 300a.

Accordingly, the outer ring 301, the ball 303, and the inner ring 302 of the first bearing 300a may stably maintain their initial clearance, thereby suppressing forced wear of the outer ring 301, the ball 303, and the inner ring 302 from being caused due to the reduction of the clearance.

Therefore, the useful life of the first bearing 300a can be extended.

So far, those specific implementations of the present disclosure have been illustrated and described. However, since the present disclosure can be embodied in various forms without departing from the essential characteristics, the implementations described above should not be limited by the specific contents for carrying out the disclosure.

In addition, even implementations not listed in the foregoing detailed description should be broadly construed within the scope of the technical idea defined in the appended claims. And, all changes and modifications included within the technical range of the claims and their equivalents should be embraced by the appended claims.

What is claimed is:

1. An electric motor comprising:
a base;
a stator coupled to an outside of the base;
a rotor rotatably coupled to the stator, the rotor comprising a rotating shaft, a rotor frame fixed to the rotating shaft in an axial direction of the rotating shaft, and permanent magnets disposed at the rotor frame;
a first bearing disposed between the base and the rotating shaft, the first bearing comprising a first outer ring, a first inner ring, and a first ball disposed between the first outer ring and the first inner ring;
a second bearing disposed between the base and the rotating shaft and spaced apart from the first bearing in the axial direction, the second bearing comprising a second outer ring, a second inner ring, and a second ball disposed between the second outer ring and the second inner ring;
a preload washer that defines a rotating shaft hole receiving the rotating shaft and is configured to apply a preset intensity of preload to the first inner ring or the second inner ring, the preload washer comprising:
a shaft section that has a preset fixed length in the axial direction, and
an elastically-deformable portion that extends from an end portion of the shaft section and is configured to elastically deform; and
a coupling member movably coupled to an end portion of the rotating shaft and configured to move relative to the rotating shaft in the axial direction, the coupling member being configured to cause the preload washer to deform in the axial direction,
wherein the rotor frame is disposed at an upper side of the first bearing in the axial direction,
wherein the preload washer is inserted between the rotor frame and the first inner ring,
wherein the shaft section has a first end portion in contact with the first inner ring and a second end portion configured to contact the rotor frame, and
wherein the elastically-deformable portion extends from the first end portion of the shaft section in a radial direction of the rotating shaft and the axial direction, the elastically-deformable portion having a free length to thereby come into contact with the rotor frame.

2. The electric motor of claim 1, wherein the elastically-deformable portion comprises a plurality of elastically-deformable portions that are spaced apart from one another in a circumferential direction of the rotor.

3. The electric motor of claim 2, wherein the preload washer further comprises a rotor frame contact portion that connects end portions of the plurality of elastically-deformable portions to one another, the rotor frame contact portion having a ring shape and being configured to contact the rotor frame.

4. The electric motor of claim 1, wherein the coupling member comprises:
a screw configured to be inserted into the rotating shaft; and
a washer disposed between the rotating shaft and the screw.

5. The electric motor of claim 1, wherein the base defines bearing accommodating portions that accommodate the first bearing and the second bearing.

6. The electric motor of claim 1, wherein the base comprises:
a first supporting portion configured to support the first outer ring in the axial direction; and
a second supporting portion configured to support the second outer ring in the axial direction.

7. The electric motor of claim 1, wherein the preload washer comprises a first partial preload washer and a second partial preload washer that are coupled to each other in the axial direction.

8. The electric motor of claim 7, wherein the first partial preload washer defines a first part of the preset fixed length in the axial direction, the first partial preload washer comprising:
a first partial shaft section coupled to the rotating shaft, and
a first elastically-deformable portion that extends from the first partial shaft section in the radial direction of the rotating shaft and the axial direction, the first elastically-deformable portion having a free length and configured to elastically deform in the axial direction, and
wherein the second partial preload washer defines a second part of the preset fixed length in the axial direction, the second partial preload washer comprising:
a second partial shaft section coupled to the rotating shaft, and
a contact portion that extends from the second partial shaft section in the radial direction.

9. The electric motor of claim 8, wherein the preload washer further comprises an engagement part that couples the first partial shaft section to the second partial shaft section such that the first partial shaft section and the second partial shaft section overlap with each other in the axial direction and are fixed to each other in a circumferential direction of the rotor.

10. The electric motor of claim 8, wherein the second partial preload washer defines a first partial shaft section accommodating portion that accommodates the first partial shaft section in the axial direction.

11. The electric motor of claim 10, wherein an end portion of the first partial shaft section accommodating portion is configured to, based on the first elastically-deformable portion being elastically deformed, come into contact with and support the first elastically-deformable portion in the axial direction.

12. The electric motor of claim 8, wherein an elastic modulus of the second partial preload washer is less than an elastic modulus of the first partial preload washer.

13. An electric motor comprising:
a base;
a stator coupled to an outside of the base;
a rotor rotatably coupled to the stator, the rotor comprising a rotating shaft, a rotor frame fixed to the rotating shaft in an axial direction of the rotating shaft, and permanent magnets disposed at the rotor frame;
a first bearing disposed between the base and the rotating shaft, the first bearing comprising a first outer ring, a first inner ring, and a first ball disposed between the first outer ring and the first inner ring;
a second bearing disposed between the base and the rotating shaft and spaced apart from the first bearing in the axial direction, the second bearing comprising a second outer ring, a second inner ring, and a second ball disposed between the second outer ring and the second inner ring;
a preload washer that defines a rotating shaft hole receiving the rotating shaft and is configured to apply a preset intensity of preload to the first inner ring or the second inner ring, the preload washer comprising:
a shaft section that has a preset fixed length in the axial direction, and
an elastically-deformable portion that extends from an end portion of the shaft section and is configured to elastically deform; and
a coupling member movably coupled to an end portion of the rotating shaft and configured to move relative to the rotating shaft in the axial direction, the coupling member being configured to cause the preload washer to deform in the axial direction,
wherein the rotor frame is disposed at a lower side of the second bearing,
wherein the preload washer is inserted between the coupling member and the second inner ring,
wherein the shaft section has a first end portion in contact with the second inner ring and a second end portion configured to contact the coupling member, and
wherein the elastically-deformable portion extends from the second end portion of the shaft section in a radial direction of the rotating shaft and the axial direction, the elastically-deformable portion having a free length to thereby come into contact with the coupling member.

14. An electric motor comprising:
a base;
a stator coupled to an outside of the base;
a rotor rotatably coupled to the stator, the rotor comprising a rotating shaft, a rotor frame fixed to the rotating shaft in an axial direction of the rotating shaft, and permanent magnets disposed at the rotor frame;
a first bearing disposed between the base and the rotating shaft, the first bearing comprising a first outer ring, a first inner ring, and a first ball disposed between the first outer ring and the first inner ring;
a second bearing disposed between the base and the rotating shaft and spaced apart from the first bearing in the axial direction, the second bearing comprising a second outer ring, a second inner ring, and a second ball disposed between the second outer ring and the second inner ring;
a preload washer that defines a rotating shaft hole receiving the rotating shaft and is configured to apply a preset intensity of preload to the first inner ring or the second inner ring, the preload washer comprising:
a shaft section that has a preset fixed length in the axial direction, and
an elastically-deformable portion that extends from an end portion of the shaft section and is configured to elastically deform; and
a coupling member movably coupled to an end portion of the rotating shaft and configured to move relative to the rotating shaft in the axial direction, the coupling member being configured to cause the preload washer to deform in the axial direction,
wherein the rotor frame is disposed at an upper side of the first bearing in the axial direction, and
wherein the preload washer is inserted between the second inner ring and the coupling member.

15. The electric motor of claim 14, wherein the shaft section has a first end portion in contact with the coupling member and a second end portion configured to contact the end portion of the rotating shaft, and
wherein the elastically-deformable portion extends from the shaft section in a radial direction of the rotating shaft and the axial direction, the elastically-deformable portion having a free length to thereby come into contact with the second inner ring.

16. The electric motor of claim 15, wherein the elastically-deformable portion comprises a plurality of elastically-deformable portions that are spaced apart from one another in a circumferential direction of the rotor, and
wherein the preload washer further comprises an inner ring contact portion that connects end portions of the plurality of elastically-deformable portions to one another, the inner ring contact portion being configured to contact the second inner ring.

17. The electric motor of claim 16, wherein the preload washer further comprises a skirt portion that extends from the inner ring contact portion in the axial direction.

* * * * *